INVENTOR.
MICHAEL K. VOSBURY
BY
ATTORNEY

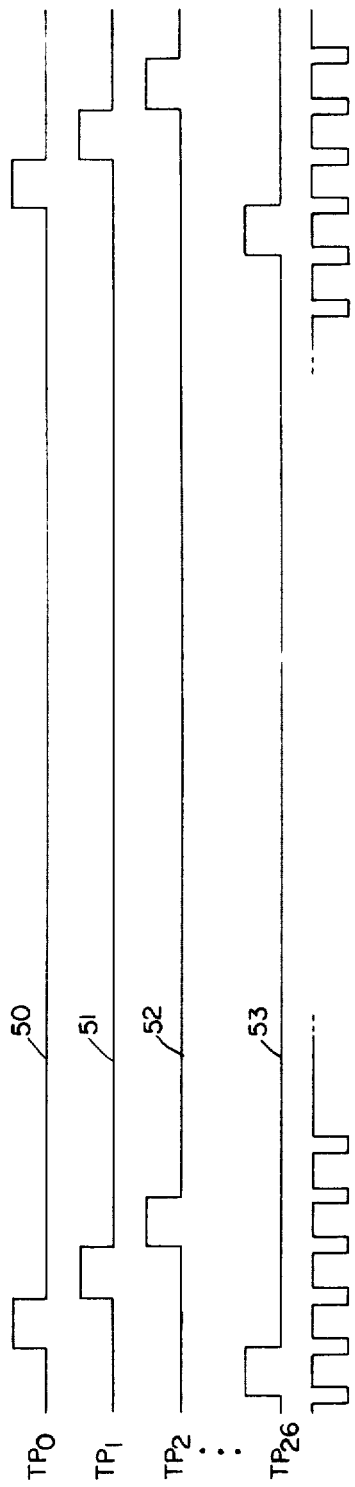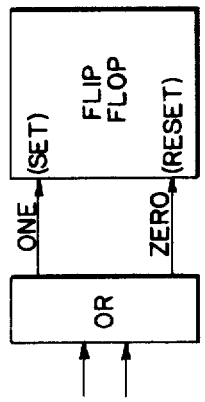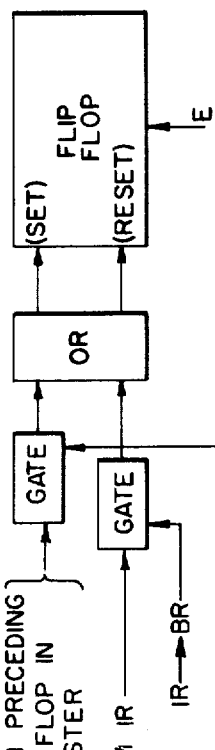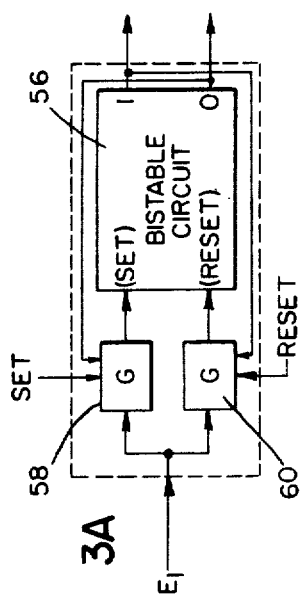

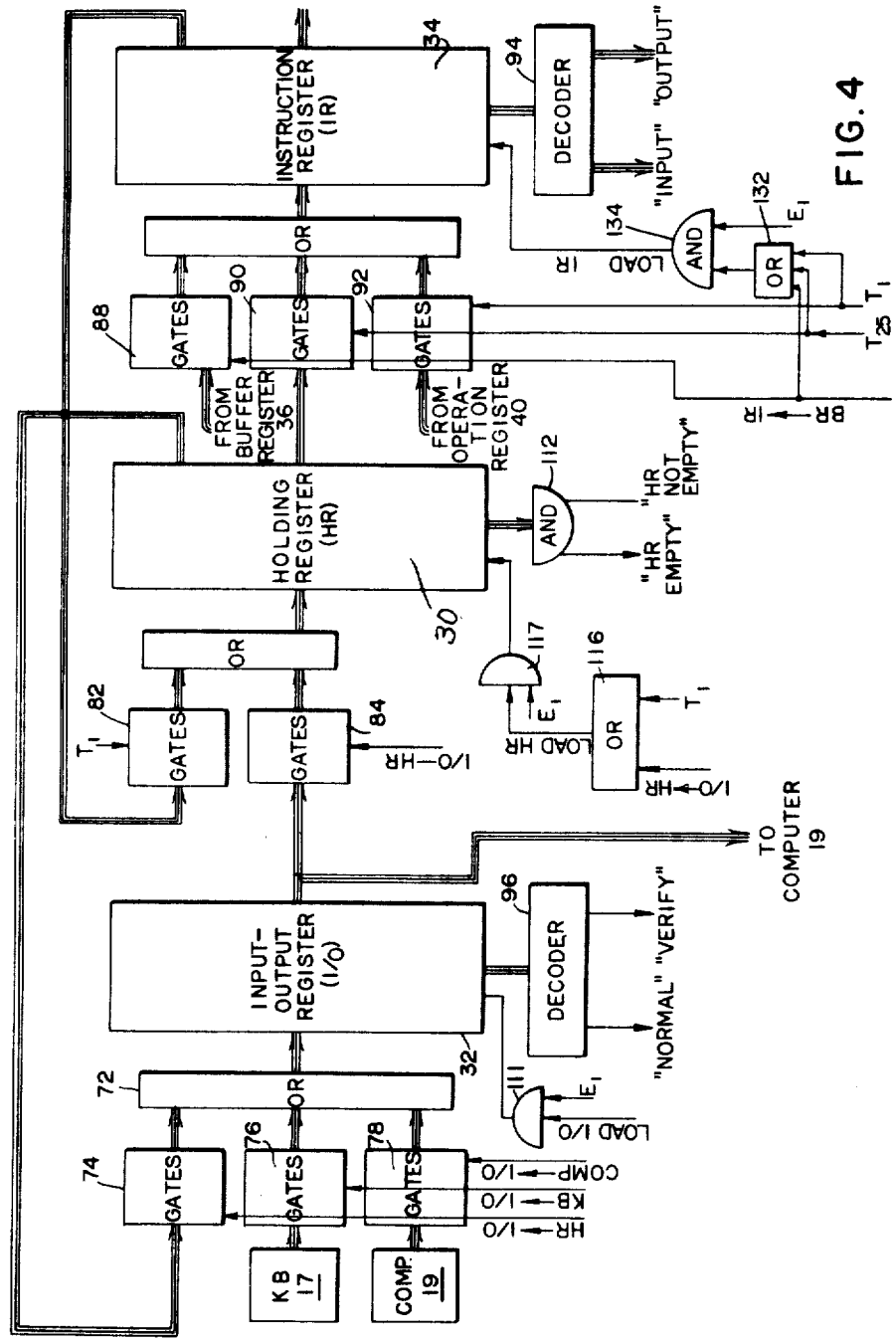

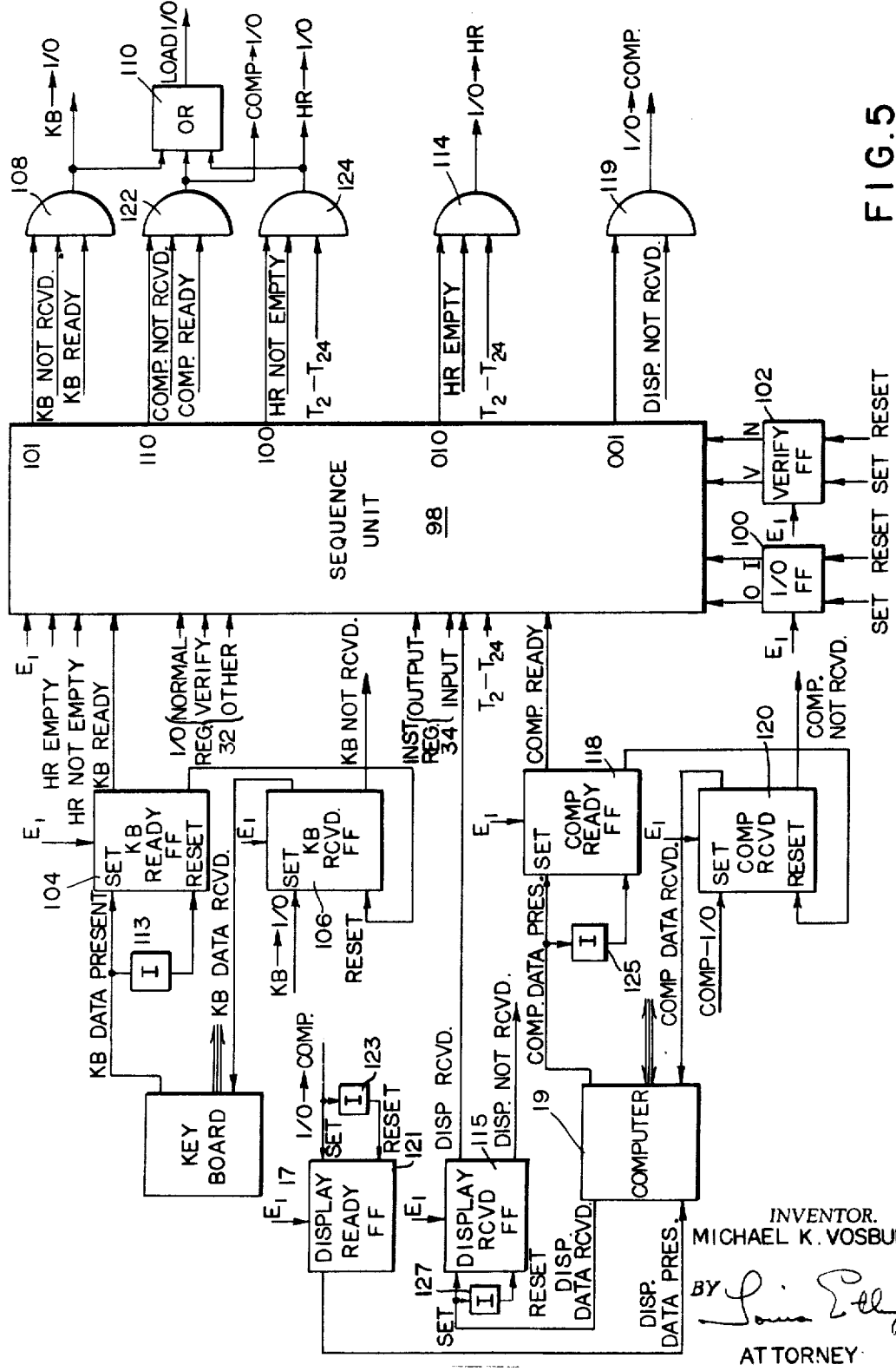

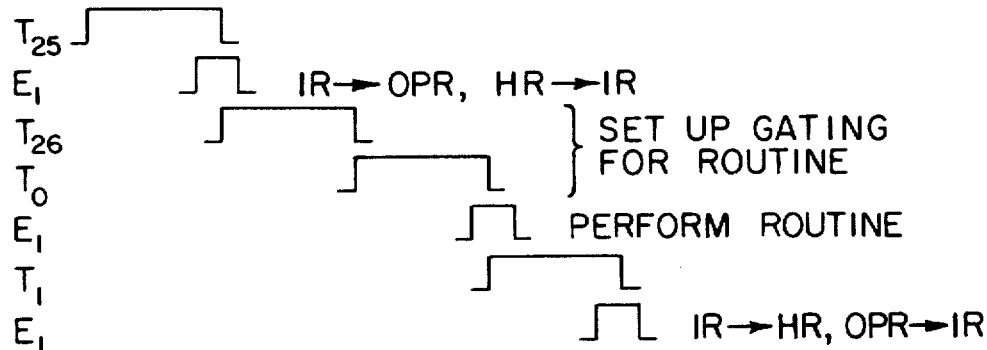
FIG. 6
FIG.8A ....h ABCDEFG cr HJKMN Lf OP ht QR cr STUV....
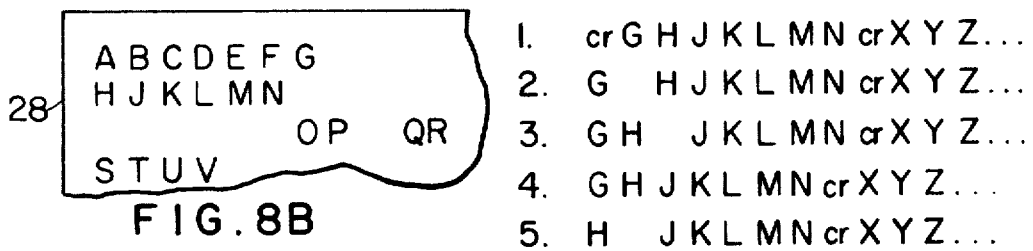
1. cr G H J K L MN cr X Y Z...
2. G  H J K L MN cr X Y Z...
3. G H   J K L MN cr X Y Z...
4. G H J K L MN cr X Y Z...
5. H   J K L MN cr X Y Z...
FIG. 8B
FIG. 8C
FIG.8D  h NAME cr ADDRESS cr AGE h ht _ JONES cr ht
ht BOSTON cr ht 27...
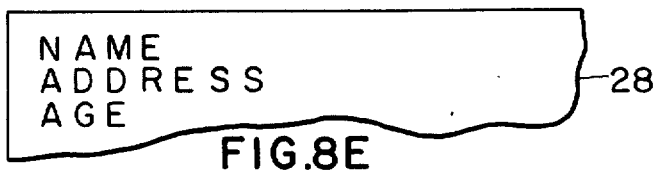
FIG.8E
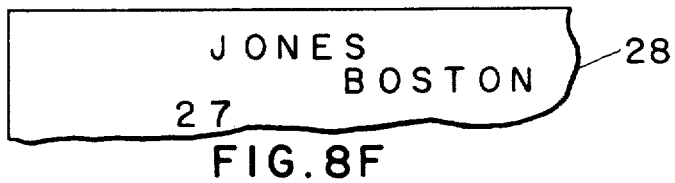
FIG.8F
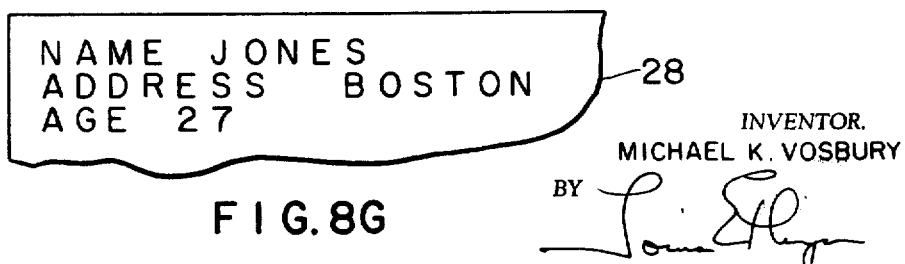
FIG.8G
INVENTOR.
MICHAEL K. VOSBURY
BY
ATTORNEY

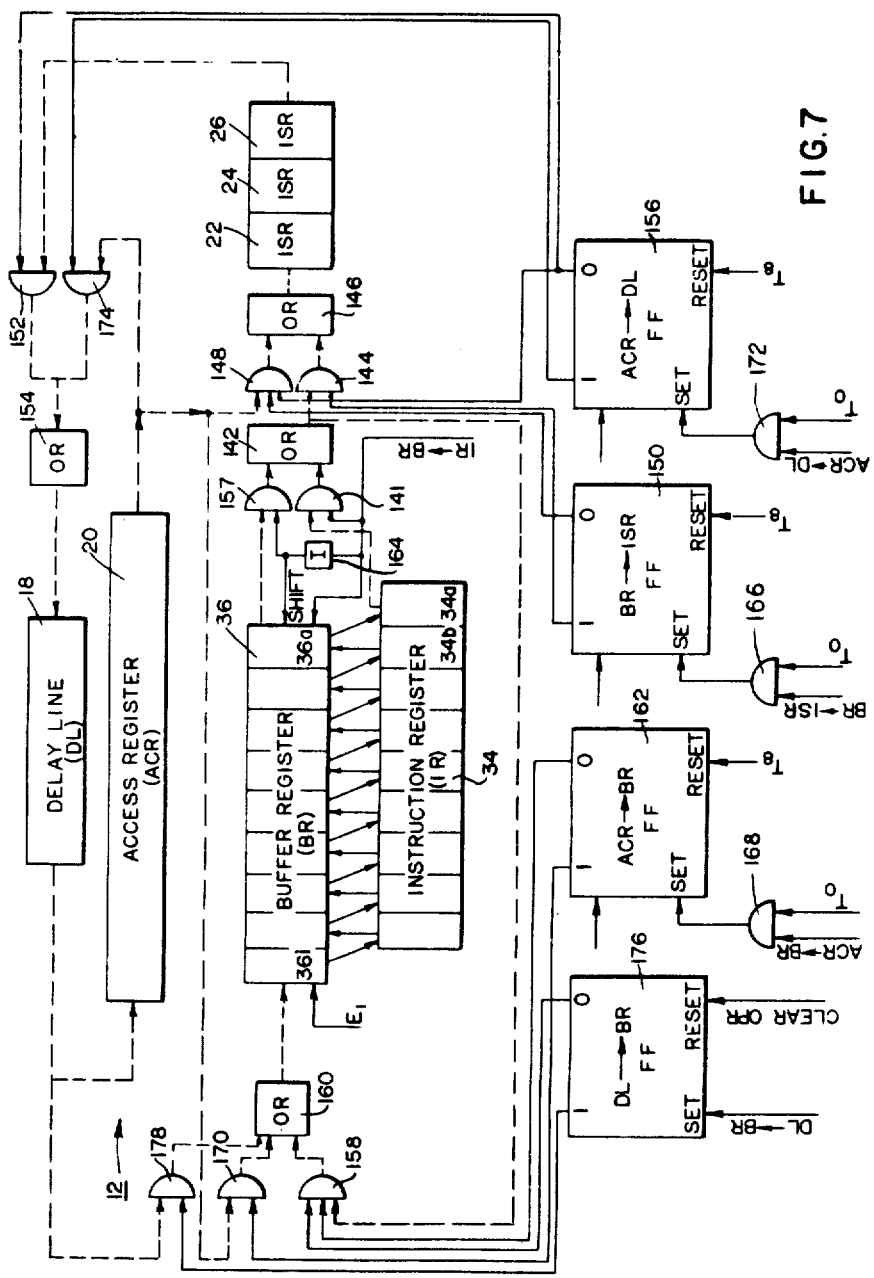

INVENTOR.
MICHAEL K. VOSBURY
BY
ATTORNEY

\* DEPENDING ON ROUTINE TO BE PERFORMED

FIG. 19

TABLE I

| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | SEQUENCE UNIT | 000 | 111 | 101 | 011 | 010 | 011 | 101 | 001 | 111 | 110 | 011 | 000 | 100 | 001 | 001 |
| CONDITIONS | INSTRUCTION REGISTER ($T_3$–$T_{25}$) OUTPUT | | | | | | | | | | | | X | | | |
| | OTHER | X | | | | | | | | | | | | | | |
| | I/O REGISTER 32 NORMAL | | | | | | X | | | | | | | | | |
| | VERIFY | | | | | | | | | | | X | | | | |
| | OTHER | | | | X | | | | | | | | | | | |
| | HOLD REGISTER ($T_3$–$T_{25}$) EMPTY | | | | | | | | | | | | | X | | |
| | NOT EMPTY | | | | | | | X | | | | | | | | |
| | I/O VERIFY FF 102 VERIFY | | | | X | | | | | | | | | | | |
| | NORMAL | | | | | | | | X | | | | | | | |
| | I/O FF 100 IN | | | | | | | | | | | | | | X | |
| | OUT | | | | | | | | | | | | | | | |
| | COMP. READY | | | | | | | X | | | | | | | | |
| | KB READY | | X | | | | | | | | | | | | | |
| | DISPLAY RCVD. | | | | | | | | X | | | | | | | |
| | DISPLAY NOT RCVD. | | | | | | | | | | | | | | X | |
| RESPONSES | NEW SEQUENCE UNIT CONDITION | 111 | 101 | 011 | 010 | 000 | 000 | 001 | 111 | 110 | 011 | 000 | 100 | 001 | 000 | 001 |
| | SET VERIFY FF | | | | | | X | | | | | | | | | |
| | RESET VERIFY FF | | | | | | | | | | | X | | | | |
| | SET I/O FF | | | | | | | | | | | | | | | |
| | RESET I/O FF | X | | | | | | | | | | | | | | |
| | SET DISPLAY READY | | | | | | | | | | | | | | X | |
| | RESET DISPLAY READY | | | | | | | | X | | | | | X | | |
| | KB→I/O | | | X | | X | | | | | | | | | | |
| | SET KB RCVD. | | | X | | X | | | | | | | | | | |
| | COMP→I/O | | | | | | | | | | X | | | | | |
| | SET COMP RCVD. | | | | | | | | | | X | | | | | |
| | I/O→HOLD | | | | X | | X | | | | | | | | | |
| | HR→I/O | | | | | | | | | | | | | X | | |

*INVENTOR.*
MICHAEL K. VOSBURY
BY
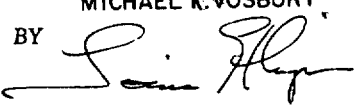
ATTORNEY

FIG. 20

|  |  | TABLE IIA NULL 1 2 3 4 5 6 7 8 | TABLE IIB RESET MARKER 1 2 3 4 5 6 7 8 | TABLE IIC HOME MARKER 1 2 3 4 5 6 7 8 |
|---|---|---|---|---|
| INSTRUCTION REGISTER 34 | OTHER | X | | |
| | OPR. CH | X | | |
| | an | X | | |
| | cr | X | | |
| | lf | X | | |
| | ht | X | | |
| | fs | X | | |
| | br | X | | |
| | bt | X | | |
| | bs | X | | |
| | h | X | | |
| | vt | X | | |
| M.A.R. 126 | FIRST | | X | X |
| | OTHER | | | X |
| | LAST | | | |
| MARKER SIGNAL | NO | | | |
| | YES | X X | | X X X |
| ACCESS REGISTER | an | | | X |
| | cr | | | X |
| | lf | | | X |
| | vt | | | X |
| | ht | | | X |
| | h | | | X |
| ROUTINE | O | X | X | |
| | Sf | | | |
| | SB | | | |
| | D | | | |
| | S | | | |
| NEW ROUTINE | OO | X | | |
| | Sf | | | |
| | SB | | | |
| | D | | | |
| | S | | | |
| OTHER RESPONSES | IR→OPR | X | | |
| | CLEAR OPR | | X | X X |
| | CLEAR MG | | X | |
| | CLEAR IR | X X | | X X |
| | MG+1 | | | X |

TABLE IV
INSERT I

United States Patent Office 3,501,746
Patented Mar. 17, 1970

3,501,746
EDITING DISPLAY SYSTEM
Michael K. Vosbury, Nashua, N.H., assignor to Sanders Associates, Inc., Nashua, N.H., a corporation of Delaware
Filed Oct. 27, 1965, Ser. No. 505,341
Int. Cl. G06f 1/00
U.S. Cl. 340—172.5   17 Claims

ABSTRACT OF THE DISCLOSURE

An editing and display system is capable of operating in both fixed and variable format modes. A format can be established in the variable format mode, and then when the system is switched to the fixed format mode, the operator is constrained to enter information in accordance with that format. This is combined with an overlay arrangement, whereby the fixed format may be stored in one part of the memory and the variable format in another part, and yet both parts are displayed in an interleaved fashion, i.e. as though the two parts had been interleaved in the memory. The invention also covers a time sharing arrangement in which different memories or different sections of the same memory may be assigned exclusively to different operators, with all the operators having access to the same editing unit for performance of editing functions in the respective memories or memory sections.

BACKGROUND OF THE INVENTION

This invention relates to a display and editing system for displaying recorded data on a display medium such as a cathode ray screen and modifying the display in accordance with various editing operations. For example, editing may take the form of insertion or deletion of various displayed characters, or changes in the positions of selected characters or groups of characters. The editing is controlled by means of externally applied instructions, either directly from a keyboard operator or indirectly by way of other data processing equipment such as a digital computer. It is carried on while the information is on display and thus the operator can visually observe the information and the changes being made therein.

Editing of information recorded in computer memories and other digital information storage systems is required in a number of situations. For example, data fed to a computer by a keyboard computer must be checked for errors and then corrected if errors are detected. This verification process is generally performed by first recording the infomation in a quasi-permanent medium such as a punched card or tape and then checking the recorded information before transferring it to the computer.

As another example, information already stored in a data processing system may be modified by changing it, adding to it, or deleting portions of it to reflect the acquisition of new data. Thus, in a simple example, a catalog of names and corresponding telephone numbers might be modified from time to time with changes in the telephone numbers and additions or deletions of subscribers' names.

Electronic typesetting is another area in which it is often desirable to be able to modify information stored in a computer memory. Specifically, it is advantageous to be able to modify the information after it has been recorded from an operator-controlled keyboard and prior to its use in "setting type, whether the latter be conventional type or a photo-offset master.

To perform any of the foregoing editing functions the location or address of previously recorded information must be known. For example, if a word is to be inserted following another word, the location of the latter word must be known for the insertion to be made. It will be apparent that the same information is required if a deletion is to be performed or a character changed. Moreover, insertions or deletions often require shifting of the information to subsequent locations to make room for new material or to fill up the space resulting from the removal of recorded information. A digital computer can be programmed to accomplish all these functions, but this requires a substantial amount of time in a conventional general purpose data processing system, and therefore is costly when such a system is used for this purpose.

Additionally, it is generally desirable, if not essential, that an operator view the recorded information when the various editing operations are to be performed. Thus, when editing is to be handled by means of a typewriter keyboard, the operator should be able to observe the recorded information and changes therein effected by means of the keyboard, both to facilitate performance of the editing operations and to verify the recorded information and its format following editing. The present invention provides both the display and location functions as well as a number of highly desirable editing operations which are performed automatically in response to appropriate command signals.

More particularly, it is an object of the invention to provide an editing system for modifying information which may be stored in the memory of a digital computer or other data processing system.

Another object of the invention is to provide an editing system of the above type in which the recorded information may be modified under the control of other data processing equipment or directly by a keyboard operator.

A further object of the invention is to provide a system of the above type which is capable of modifying recorded information either before or after it has been stored in a computer memory.

Yet another object of the invention is to provide an editing system of the above type which displays the recorded information during editing, so that the operator can see the information and observe the changes therein effected by the editing operations. Moreover, the operator should be able to modify the displayed information at any location in the display without having to known the corresponding address of that location in a memory in which the information is stored.

A further object of the invention is to provide a system of the above type adaptable for concurrent use with a plurality of displays, information sources and external memory devices.

Another object of the invention is to provide an editing system of the above type which has a relatively low cost and can be operated without the use of special skills.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 2 is a chart illustrating the relationships of various timing signals used in the system;

FIGS. 3A, 3B and 3C are diagrams illustrating the basic circuit units used in the system;

FIG. 4 is a schematic diagram showing the interconnection of several of the registers incorporated in the system;

FIG. 5 is a diagram of the control unit used in the input-output section;

FIG. 6 is a diagram showing the timing of certain sequences in the operation of the registers of FIG. 4;

FIG. 7 is a schematic diagram of the circuit elements used in transferring characters into and out of the memory in the system of FIG. 1;

FIGS. 8A–8G are diagrams showing the relationships of the addresses of certain characters stored in the memory to the locations of the characters in the display provided by the system;

Figure 21:
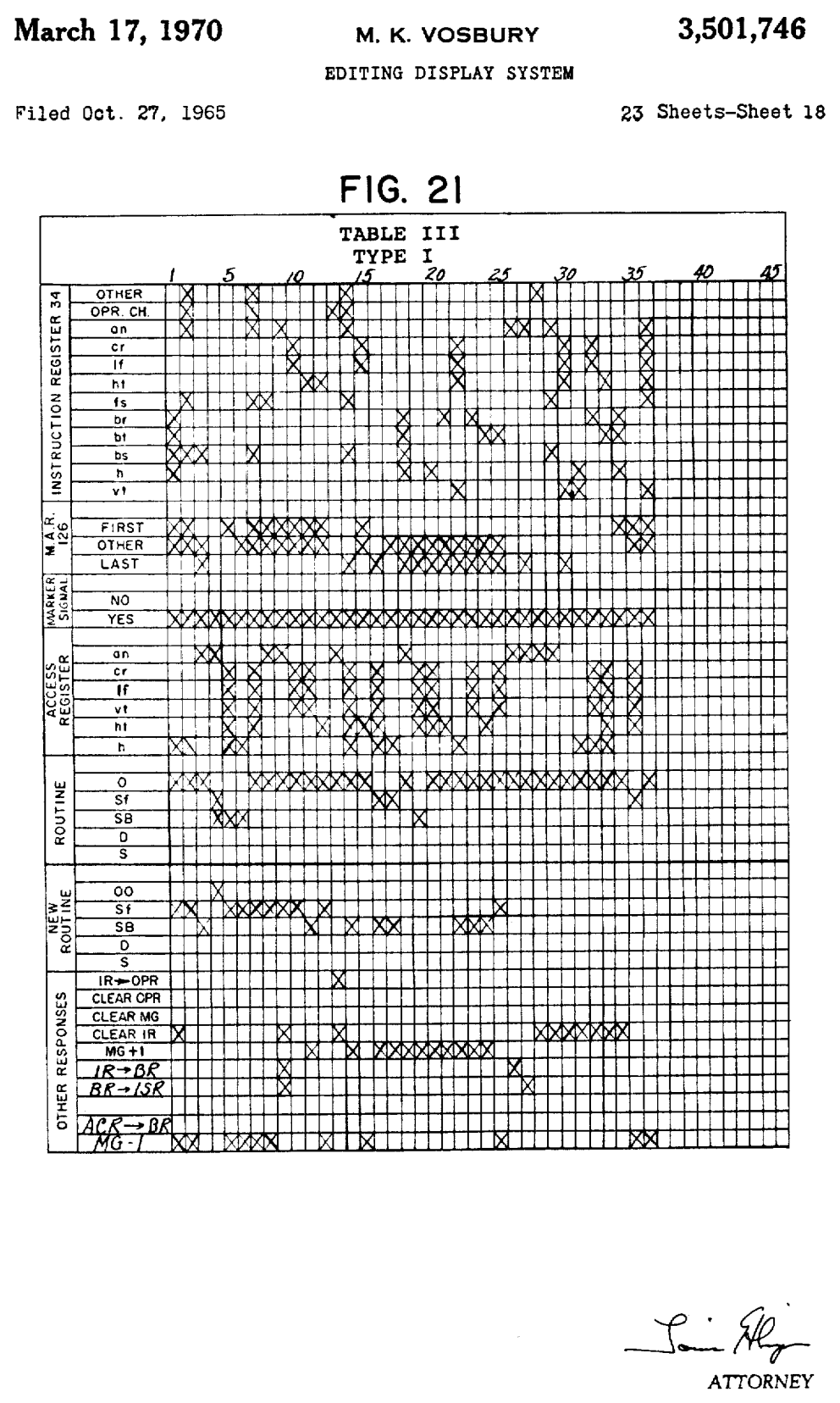
Figure 22:
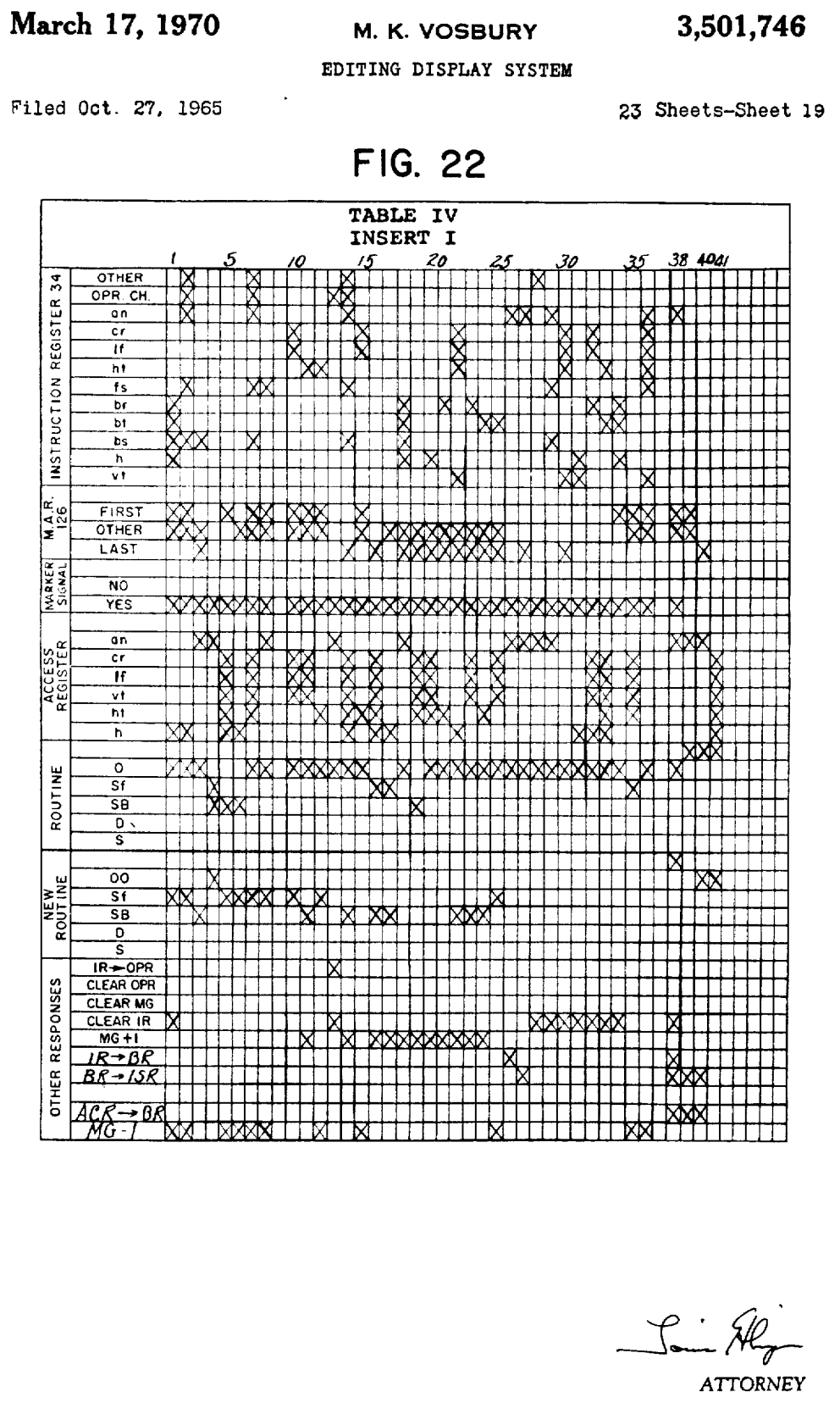
Figure 23:
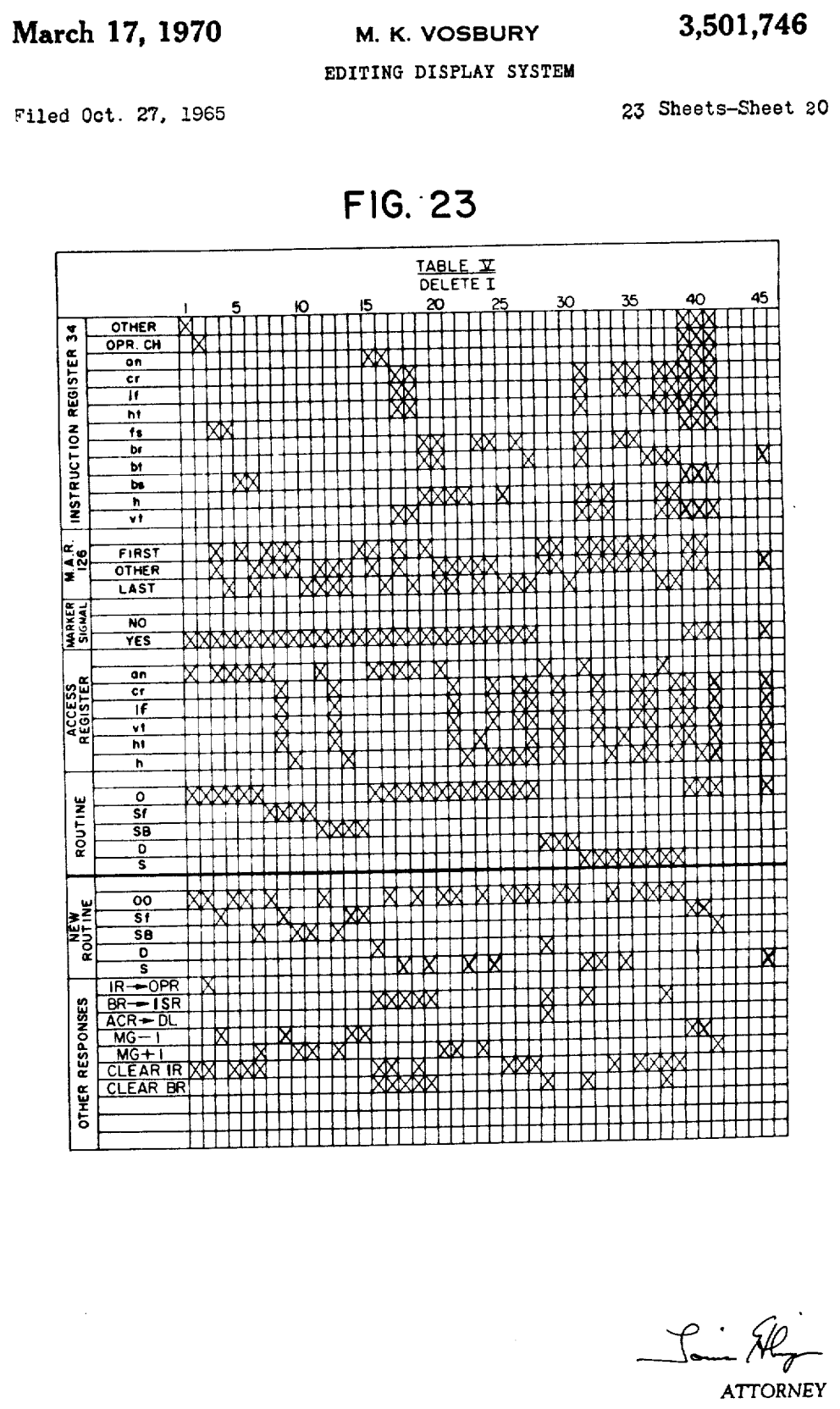
Figure 24:
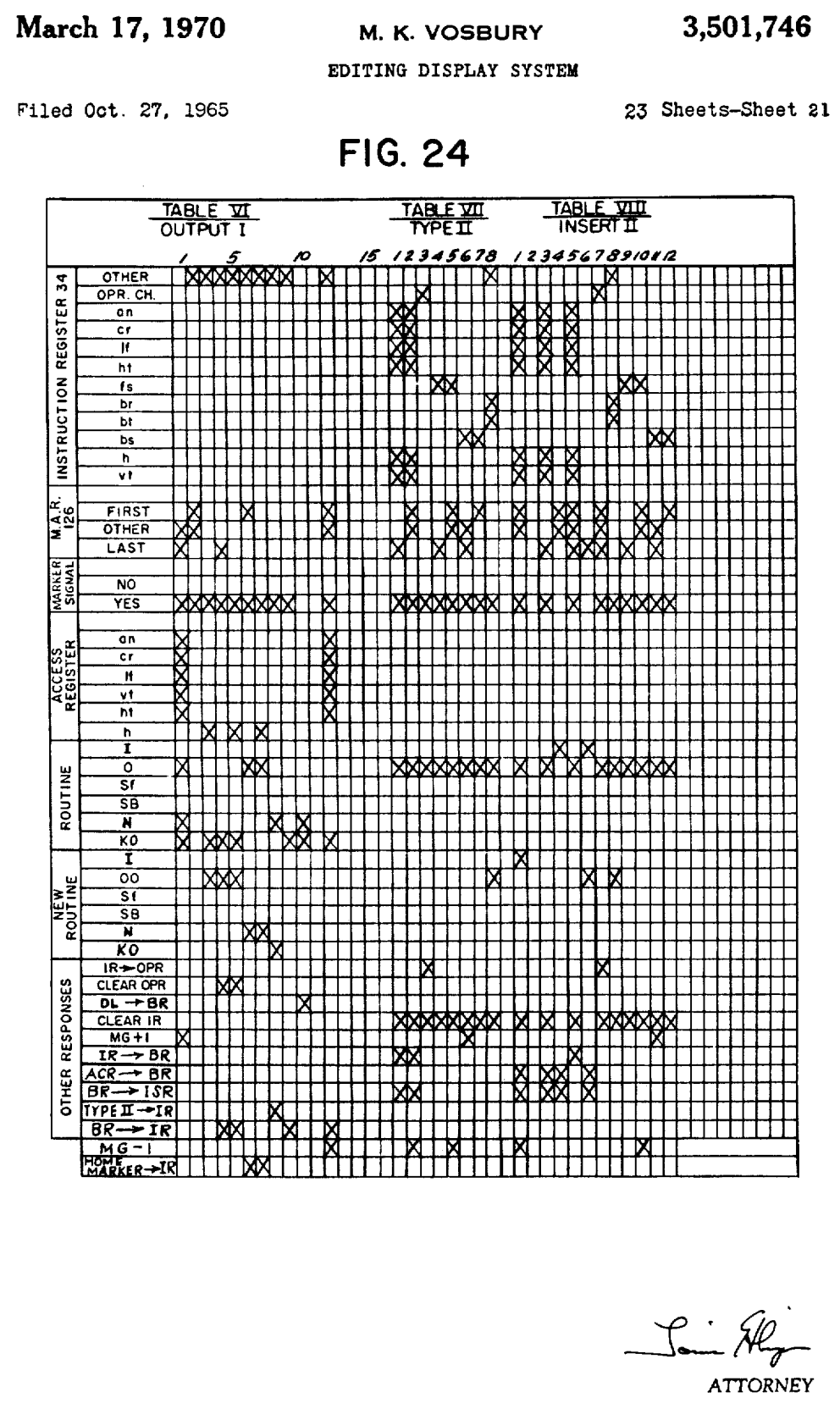
Figure 25:
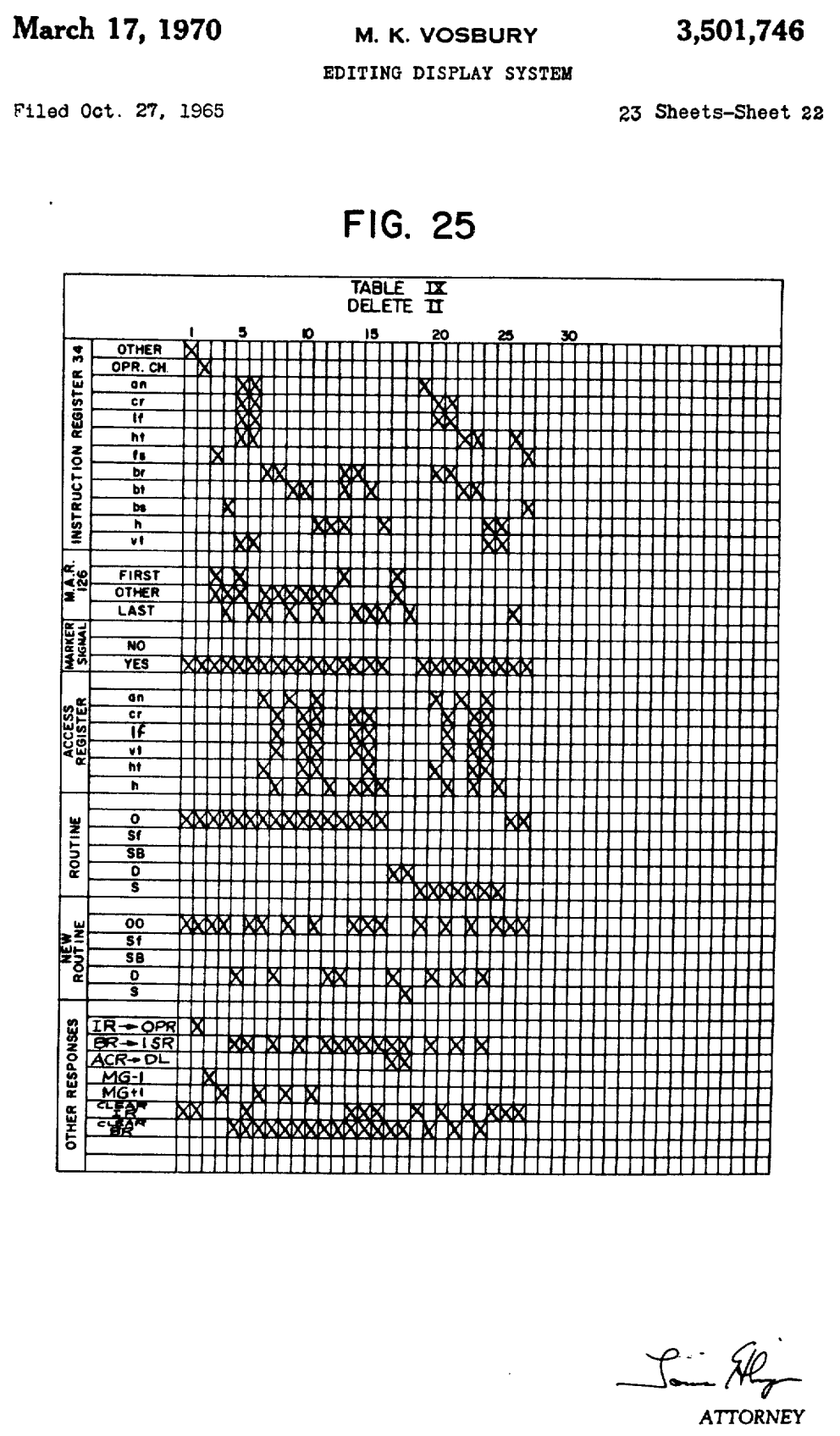
Figure 26:
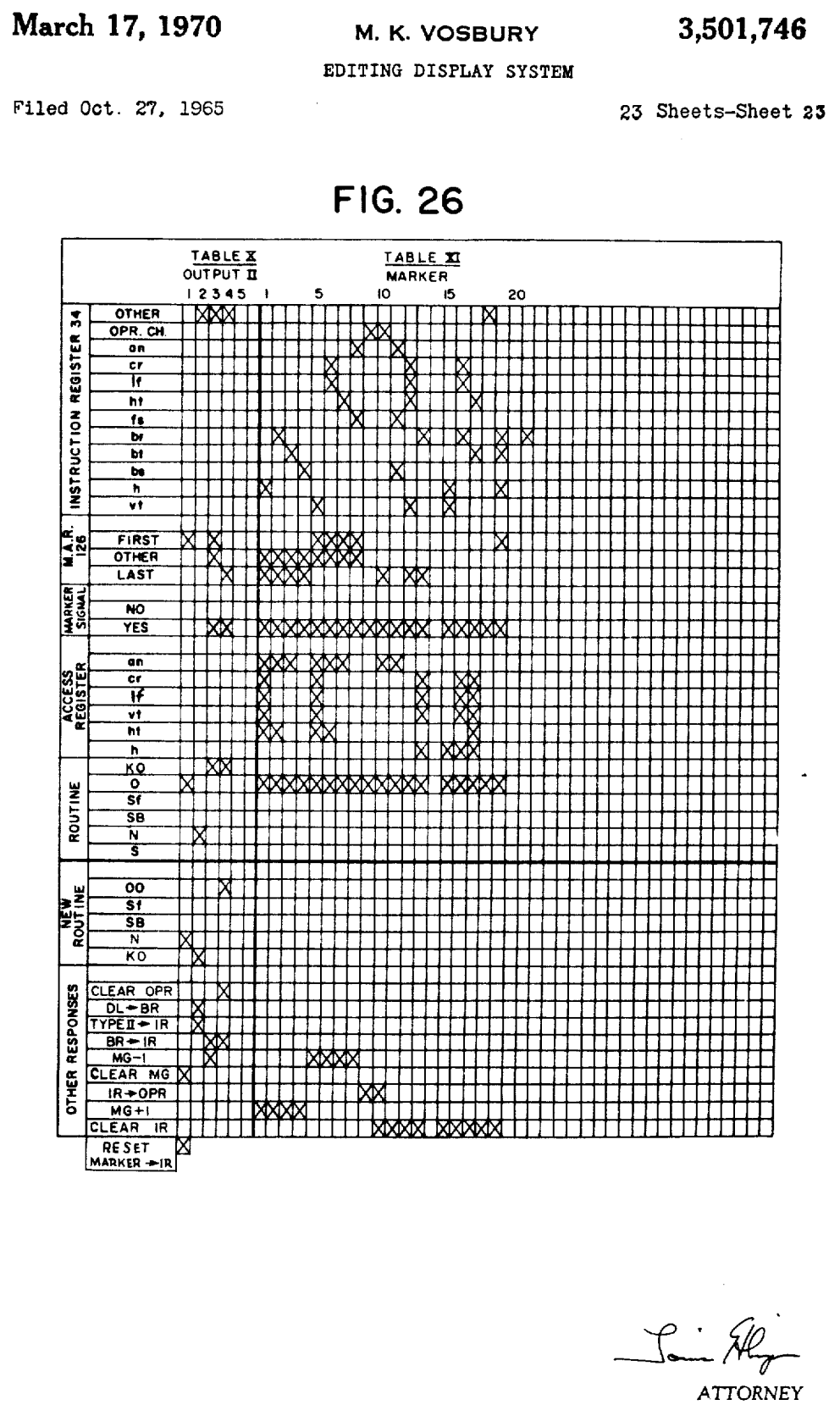

FIGS. 19–26 are tables illustrating the make-up of various logic circuits used in the system.

GENERAL DESCRIPTION OF THE INVENTION

Figure 1:
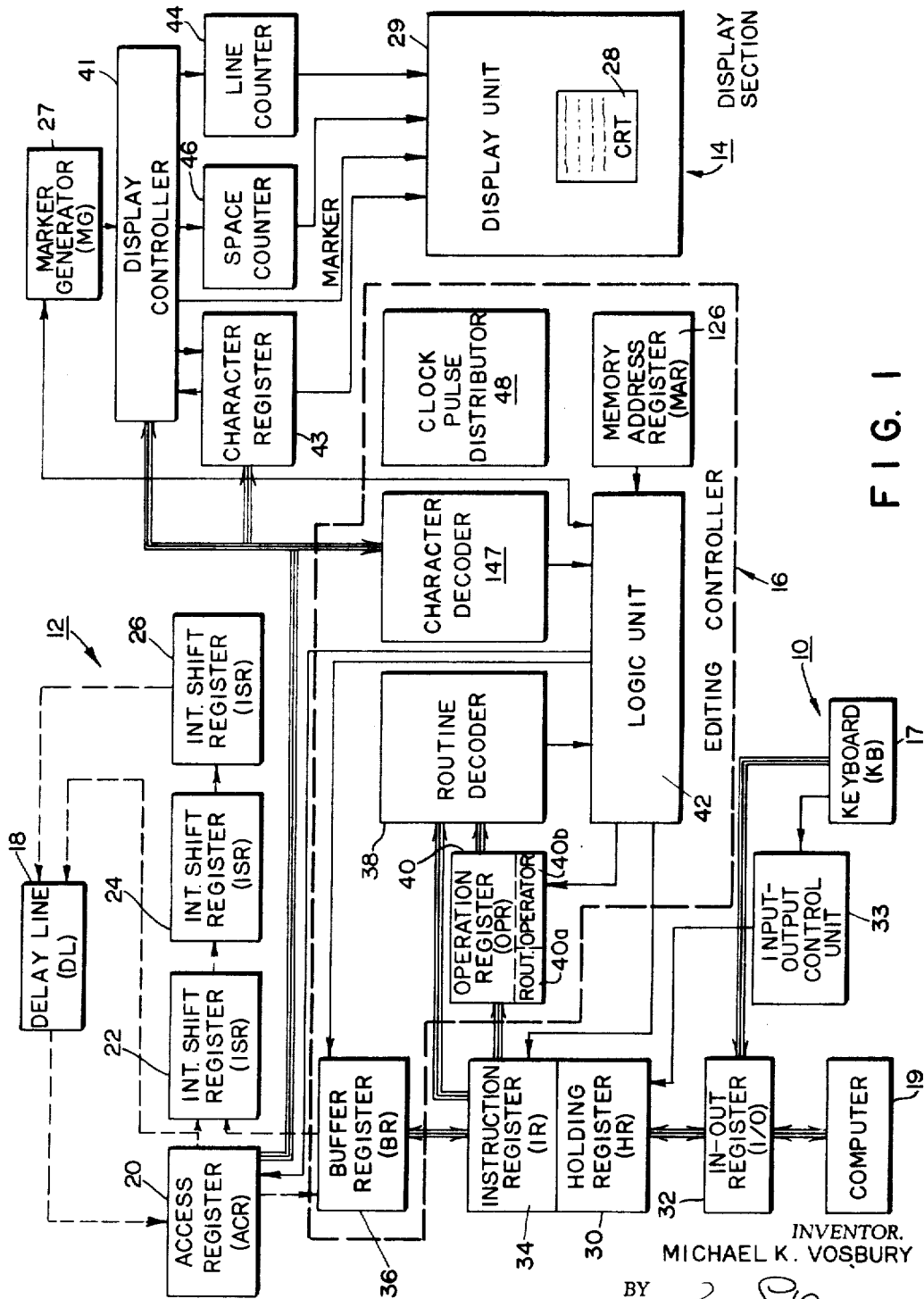
FIG. 1 is a schematic diagram, in block form, of an editing system embodying the invention.

The general organization of an editing system embodying the invention will be best understood by referring to FIG. 1. As shown therein, the system includes an input-output section 10, an internal memory 12, a display section 14 and an editing controller 16. The input-output section 10 controls the transfer of data between the system and external devices such as an operator-controlled keyboard 17 and a digital computer 19. The memory 12 stores information to be edited and displayed by the system and the display section displays the stored information.

The editing controller 16 controls changes in the content of the memory, such changes including not only changes in the stored data, but also changes in the location of address of the data within the memory 12. These latter changes automatically provide corresponding changes in the location of the data in the display provided by the display section 14, inasmuch as the information is displayed in the same order in which it is stored in the memory 12.

In the ensuing discussion the term "character" is used to denote a series of digits having a particular meaning, instead of the term "word" commonly used in computer parlance. The data on which the system operates is in the form of characters such as those found on a conventional typewriter keyboard and the digital signals used in various parts of the system are code representations of such characters and also other characters of a different nature which are discussed in detail below.

In the preferred embodiment of the invention the memory 12 is a recirculating memory. For example, it may include a magnetostrictive delay line 18 (DL), whose input and output are connected to a series of shift registers, i.e. an access register 20 (ACR) and intermediate shift registers 22, 24 and 26 (ISR). The stored information circulates bit-by-bit and character-by-character from the delay line through the registers 20–26 and back to the delay line. As each character to be displayed passes through the access register 20 it is shown on a cathode ray tube 28 in a display unit 29. The information recirculates in the memory 12 at a rate which causes it to be displayed on the tube 28 often enough to provide the illusion of a continuous display.

In a manner to be described, the system also displays a visual marker in one of the character locations on the face of the cathode ray tube 28 in response to a signal from a marker generator 27. The marker informs the operator that any editing function performed at that time will be performed in that character location. For example, if a new character is to be added, it will be "typed" into the character location identified by the marker. Specifically, the signal causing generation of the marker occurs once during each cycle of the memory 12, at the time corresponding to the display of the character in the location identified by the marker. This signal synchronizes the operation of the editing controller to take place at that time so that the operation performed by the controller will affect the content in the corresponding address in the memory 12.

At this point a number of important advantages of the invention will already be apparent. A keyboard operator can type out a succession of characters which are immediately displayed on the cathode ray tube 28 and the entire display, including both the content of the information and its format, can be visually verified by the operator or other personnel. If corrections are to be made, they can be performed immediately, as described below, with the operator proceeding to the point of correction just as though the display were a page in a conventional typewriter. It should be understood, however, that the editing operations which can be performed by the system go far beyond those which can be accomplished with a typewriter. For example, if a superfluous character is to be deleted, the system will automatically move up the succeeding characters so as to fill in the space left by the deletion. Similarly, insertions can be made by having the system automatically displace the succeeding characters to make room for the characters to be inserted.

Moreover, data stored in a digital computer memory can be modified without knowledge of the addresses in the memory of the particular characters to be changed. An entire page is transferred from the computer into the editing system, which displays it on the cathode ray tube 28. The keyboard operator can then proceed to make the changes in the manner outlined above. The modified information is then transferred from the memory 12 in the editing system back to the computer.

Thus, the invention can be used to modify information stored in digital memories of various types, such as cores, tapes and drums. Any type of information representable by means of visible characters can be modified in this manner. This includes, for example, stored computer pograms, catalog-type information in data retrieval systems and information temporarily stored for use by electronic typesetters or electrically operated typewriters. In the latter category, the invention can be used for the typing of long drafts which are then revised by means of the editing system and then automatically typed in final form.

DETAILED DESCRIPTION OF THE INVENTION

With further reference to FIG. 1, the system performs its operations in response to commands which take the form of characters that are fed into the system in the same manner as the characters loaded into the memory 12 and displayed on the cathode ray tube 28.

The command characters are of two types, viz operation characters and instruction characters. The operation characters determine the overall mode in which the system is to function, e.g. type, insert and delete. The instruction characters control specific functions such as forward space, carriage return, etc.

In the first instance the command characters control the operation of the input-output setion 10 in transmitting other characters back and forth between the editing controller 16 and any external equipment connected to the editing system. Assuming first of all that the input-output section is in an input mode, it passes a succession of characters from the keyboard 17, for example, to an in-out register 32 (I/O) and then to a holding register 30 (HR) in response to control signals from an input-output control unit 33. The editing controller 16 shifts successive characters in the register 30 into an instruction register 34 (IR) and if the characters are to be loaded into the memory 12, they are then transferred to a buffer register 36 (BR) and finally into the memory.

The type of character contained in the instruction register 34 is sensed by a routine decoder 38 and if it is an operation character controlling the mode of operation of the editing system, it is transferred to an operation register 40 (OPR) instead of being passed on to the holding register 36 and the memory 12. The decoder 38 decodes the operation character in the register 40 together with instruction characters subsequently entering the instruction register 34. Its output is used by a logic unit 42 in developing control signals which activate various other units in the system required for performance of the editing function corresponding to the instruction and operation characters. Thus, if the routine is to load succeeding characters into the memory, the latter characters will be passed through the register 34 to the holding register 36 and then loaded into the memory in locations corresponding to successive positions denoted by the marker signal on the cathode ray tube 28 as outlined above.

In addition to the data characters displayed on the tube 28, the memory contains instruction characters for the display. These latter characters, which may be termed "display instruction characters" provide such functions are *carriage return*, i.e. shift to beginning of next line, *tab, forward space*, and other functions similar to those performable on a typewriter. The display section 14 includes a display controller 41 which continuously scans the memory characters passing through the access register 20 and controls the operation of the display according to whether the characters are data characters to be displayed or display instruction characters controlling position. If the character is a data character, the controller 41 causes a character register 43 to transmit to the display unit 29 a signal identifying the character, so that the display unit will form the character on the tube 28.

The controller 41 also controls the operation of a line counter 44 and space counter 46, whose contents control the vertical and horizontal position of each character displayed on the tube 28. The space signal is incremented automatically as each character is displayed so as to display the characters in successive positions along each line. The space and line signals are also incremented by character position instructions such as horizontal tab and carriage return. The display controller 41 also controls display of the marker signal.

The various operations performed in the system are synchronized by the output of a clock pulse distributor 48 which continually provides a series of output timing pulses appearing one-by-one at successive terminals. The distributor 48 includes an oscillator together with counting and coincidence circuits which provide the desired distributor function. Since units of this type are common to digital data processing systems, there is no need to provide a detailed description here. However, the timing of the pulses is of interest and will now be explained.

In an illustrative system, the clock pulse distributor 48 has twenty-seven timing pulse terminals and a clock pulse cycle of twenty-seven microseconds, each timing pulse lasting for one microsecond. The timing pulses appearing at the respective terminals have the wave forms indicated at 50, 51, 52 and 53 in FIG 2. These pulses and the intervals during which they occur are both designated with the letter "T" together with subscripts indicating their order of appearance. The distributor 48 also emits at another terminal a series of execution pulses $E_1$ occurring once every microsecond, starting shortly prior to the ends of the timing pulses and lasting for one-quarter microsecond. The execution pulses actuate various circuits in the system. For example, they cause the shifting of flip-flops. In general, the timing function is provided by the coincidence of an execution pulse E and a particular timing pulse T. The circuits are designed so that their conditions change in response to the leading edges of the execution pulses.

The timing cycle is related to the characteristics of the memory 12 and the display section 14, and the number of bits assigned to each character in the memory. In a typical system each character was assigned nine bits, seven of which identify the character, the eighth is a parity bit, and the ninth a spare bit which may be used as described below. A memory capacity of approximately 1,000 characters was selected as fitting the capabilities of the cathode ray tube display which was to be used. It was found that with a delay line 18 of this approximate capacity, a bit length of one microsecond provides essentially error-free recirculation of the contents of the memory 12. Assuming that successive characters are immediately adjacent to each other in the delay line 18, this means that a new character is contained in the access register 20 every nine microseconds.

However, the time required for the display unit 29 to generate a character on the face of the cathode ray tube 28 may exceed nine microseconds, in which case the display unit cannot generate successive characters as fast as they appear in the access register 20. In fact, a particular display unit used in conjunction with the editing system requires in excess of eighteen microseconds to generate a character. Thus, successive characters displayed on the cathode ray tube 28 must be spaced apart by somewhat more than nine microseconds on the delay line 18. In order to utilize fully the capacity of the memory 12, the spaces between successively displayed characters are used to store other characters which are displayed somewhat later.

More specifically, with the contemplated display unit, there is an interval of eighteen microseconds in the memory 12 between successively displayed characters. Thus, two additional characters can be fitted in between each pair of successively displayed characters.

The 27-pulse timing sequence with one microsecond per pulse corresponds to this arrangement of the memory 12. That is, exactly three internal memory locations pass through the access register 20 during each timing pulse sequence. Since the register 20 is continually receiving bits from the delay line 18 and delivering them to the register 22, each character location of nine bits is contained in the register 20 for an interval of one microsecond of the nine microseconds corresponding to a character location. The system is arranged so that successive character locations in the memory 12 are contained in the register 20 during timing intervals $T_0$, $T_9$ and $T_{18}$. By means of a suitable gating arrangement to be described, the register 20 is accessible for inspection of its contents during the interval $T_0$. Thus, the rest of the system has access to every third character location passing through the register 20.

This is the reason for the inclusion of the registers 22, 24 and 26. In some cases it is desirable to move a character in the memory 12 ahead to the next accessible location. When the character is in the access register 20, the next previous accessible location has passed through the registers 22 and 24 and is thus contained in the register 26. The character can then be fed from the register 20 directly to the delay line 18, bypassing the registers 22–26 and replacing the character in the register 26 which otherwise pass into the delay line at that time.

With the foregoing arrangement the total character capacity of the memory 12 should not be exactly divisible by 3. The reason for this will be understood from the following examples. First, let the character capacity of the memory 12 equal N. Next, assign to successive character locations in the memory, including both the delay line 18 and registers 20-26, the numbers 1 to N. T. The rest of the system inspects the character in location No. 1 when it appears in the register 20; the next location to which the system has access is No. 4, then No. 7, and so on.

In the first example, assume that N is exactly divisible by 3. Eventually, location N−2 will become accessible, and the next accessible memory location, the third location after N−2, will be location No. 1 again. Thus, the same location will be accessible for successive cycles of the memory 12 and the intermediate locations will never be accessible.

Next, assume that N is not exactly divisible by 3. For example, N may be 1000, i.e. 999+1. In this case, location N will become accessible at the end of the first memory cycle and the next accessible location will be No. 3, succeeding locations being Nos. 6, 9, 12, etc., during the second cycle of the memory 12. At the end of the second cycle location N−1 will become accessible and the next accessible location will be No. 2. Succeeding accessible locations during the third cycle of the memory 12 will be Nos. 5, 8, 11, etc., and the last accessible location during this cycle will be N−2. The next accessible location is No. 1, so that during the fourth cycle of the memory 12 the first series of accessible locations is repeated. In this manner the system has access to all the locations in the memory 12 over a period of three memory cycles. A similar result is obtained if N is divisible by 3 with a remainder of 2 instead of 1.

It should be understood that while the memory 12 is internally organized as described above, the rest of the system operates on the basis of successive accessible locations, as though the accessible locations were in fact successively disposed within the memory. Thus, the "memory addresses" referred to herein are in fact accessible locations.

In the detailed description of the invention which follows, it will be helpful to have a prior understanding of the nature of certain circuit elements which may differ somewhat from the counterparts in other digital systems. Thus, as shown in FIG. 3A, the flip-flop indicated in the drawings include conventional bistable circuits 56 with execution pulses transmitted to the "set" and "reset" input terminals of each bistable circuit 56 by way of gates 58 and 60, respectively. The enabling input terminals of the gates 58 and 60 are the "set" and "reset" input terminals of the flip-flop and the ONE and ZERO output terminals of the bistable circuit are also the output terminals of the flip-flop.

Thus, if neither of the gates 58 and 60 is enabled, incoming pulses E will cause no change in the state of the bistable circuit 56. If only the gate 58 is enabled, the next execution pulse will set the circuit 56 and similarly, if only the gate 60 is enabled, the circuit will be reset. If both the gates 58 and 60 receive external enabling signals, the flip-flop is complemented, i.e. its state is changed regardless of its original state. A conventional feedback arrangement disables one of the gates to ensure the complement function.

The various registers shown in the drawings comprise flip-flops of the type shown in FIG. 3A. Where transfer of a character from one register to another is a parallel operation, both ONES and ZEROES are transferred. Where parallel transfer into a register can be from two or more other registers, the gated outputs of corresponding flip-flops in the other registers are combined in OR circuits connected to the inputs of the corresponding flip-flops in the receiving register and, in order to provide for both ONE and ZERO transfer in such cases, each OR circuit is provided with a ONE and ZERO output as shown in FIG. 3B. The ZERO output may be obtained simply by inversion of the ONE output.

The gates 58 and 60 are diode-capacitor type gates and therefore they delay the enabling and disabling processes for a finite time after the corresponding signals are applied. This permits simultaneous transfer into and out of a register.

Shift registers employ the same flip-flops, with an end flip-flop deriving its signal input from another shift register or from the delay line 18, and the other flip-flops in the register receiving their signal inputs from adjacent flip-flops in the same register. The buffer register 36 is arranged for both parallel transmission of signals with the instruction register 34, and serial transfer with the registers 20 and 22. For this purpose flip-flops in the register 36 may be arranged as in FIG. 3C.

Although not specifically shown in the drawings, each LOAD pulse causing a register to be loaded with the contents of another register is also applied to the transferring register. Thus, if the inputs to the latter register are not enabled, it will be cleared by the pulse.

In the drawings parallel transmission of digital signals is indicated by parallel lines, with arrows indicating the direction of transmission, as between the registers 30 and 32 in FIG. 1. Serial transmission is indicated by dashed lines with arrows. Single solid lines indicate the transmission of control signals.

INPUT-OUTPUT SECTION

The input-output section 10 is shown in detail in FIGS. 4 and 5. As shown in FIG. 4, the in-out register 32 receives its digital inputs from OR circuits 72 connected to gates 74, 76 and 78. The gates 74 supply input signals from the holding register 30, while the gates 76 and 78 are used to connect the keyboard 17 and computer 19 to the register 32. The holding register 30 is connected to OR circuits 80 deriving input signals from gates 82 and 84. The gate 82 transfers to the register 30 the contents of the instruction register 34 and the gates 84 are used to transfer the contents of the in-out register 32 to the register 30.

The instruction register 34 is connected to OR circuits 86 which are connected in turn to gates 88, 90 and 92. The gates 90 transfer the contents of the register 30 to the register 34 and the gates 88 and 92 transfer the contents of the registers 36 and 40 (FIG. 1), respectively, to the register 34.

With reference to FIG. 1, loading and unloading of the in-out register 32 are controlled by the input-output control unit 33, loading and unloading of the instruction register 34 are controlled by the logic unit 42, and loading and unloading of the holding register 30 are controlled by both the control unit 33 and the logic unit 42.

The illustrated input-output section has two input modes and one output mode. The first of these is a *normal* mode in which characters from the keyboard 17 or computer 19 are loaded into the input-output register 32 and then transferred through the holding register 30 to the instruction register 34.

Next, there is a *verified keyboard* input mode in which character from the keyboard are loaded into the in-out register 32, then transmitted from the register 32 to the computer 19, stored in the computer and retransmitted to the register 32, and finally transferred from the register to the holding register 30 and to the rest of the editing system. Thus, in this mode the editing system can be used to verify not only the characters coming from the keyboard 17, but also the accuracy of transmission to the computer and the accuracy of the computer itself in storing the character. It will be apparent that this verification applies to both displayed characters and instruction characters controlling the positions of the displayed characters.

In the *output* mode, the input-output section transfers characters from the holding register 30 to the input-output register 32 and from the latter register to the computer 19.

The input-output section is switched into its various modes by means of command characters normally transmitted from the keyboard 17 or computer 19 in the same manner as other characters. Thus, when the section is to operate in the output mode, a corresponding operation character from the keyboard will have been transmitted through the input-output section to the instruction register 34, where the fact that it is an output character is indicated by an "output" signal from a decoder 94 (FIG. 4). In the absence of an output instruction in the register 34, the input-output section operates in one of its input modes, as directed by an "input" signal from the decoder 94.

With further reference to FIG. 4, the input-output section is normally in its *normal* mode and when it is to switch to its *verify* mode, an appropriate instruction character in the in-out register 32 is detected by a decoder 96, which emits a "verify" control signal. When the input-output section is to switch back to its *normal* mode, another instruction character from the keyboard 17 or computer 19 is decoded by the decoder 96 to supply a "normal" signal.

The "input" and "output" signals are derived from the instruction register 34 because the corresponding operation characters are used by the editing controller 16 (FIG. 1) and therefore are contained in the register 34 during part of each timing cycle as described below in greater detail. On the other hand, the "normal" and "verify" instruction characters are used only by the input-output section; therefore they do not reach the register 34 and must be detected at the register 32.

The input-output control unit 33 of FIG. 1 is illustrated in detail in FIG. 5. As shown therein, the various input-output operation sequences are controlled by a sequence unit 98. In essence, a sequence unit comprises a flip-flop register connected to a decoder. The decoder provides an output signal at a different terminal for each of the states of the register, the states corresponding to the various routines performed by the input-output section. Each of these signals is also used in conjunction with other signals to set the register in the sequence unit 98 to a new state for initiation of the next operation, so that the input-output section automatically continues to cycle among the set of states required for the particular mode in which it is operating.

Since the routines to be performed depend on the particular input or output mode, sequencing of the sequence unit 98 is controlled in part by an in-out flip-flop 100 (I/O FF), which reflects the input or output status of the system, and a verify flip-flop 102 (VFF), which reflects the *verify* or *normal* mode of operation. The outputs of the flip-flops 100 and 102 are combined in coincidence circuits with the condition-shifting signals applied to the register in the sequence unit 98, so that the next output signal from the sequence unit 98 following any given output signal depends in general upon the state of one or both of these flip-flops.

Operation of the input-output section will now be explained with reference to FIGS. 4 and 5 and Table I, which is a decision table for the sequence unit 98 and various coincidence circuits connected to its output terminals. In Table I, as well as in the other decision tables herein, each column is divided into two portions, an upper portion reflecting the conditions of various registers, and a lower portion which reflects the responses to the coincidence of the conditions set forth in the upper portion. Where a column has marks in two or more rows corresponding to different conditions in the same register, the corresponding function is an OR function, i.e. the required condition for the register is met if it is in any one of the marked states. Where a column contains *no* marks in rows corresponding to a register, the state of the register is immaterial for the responses listed in that column.

For convenience, the various states of the sequence unit 98 have been designated by binary numbers corresponding to the states of the register therein.

Assume first of all that the entire system has been cleared, with the verify flip-flop 102 in the *normal* state and the sequence unit 98 in the 000 state. In the absence of an output instruction in the register 34 (FIG. 4), the decoder 94 emits an "input" signal to the sequence unit 98 (FIG. 5) during the interval $T_3-T_{25}$, thereby providing the conditions of column 1 of Table I. The next execution pulse $E_1$ thus causes the sequence unit 98 to shift to the 111 state.

Next, assume that the keyboard operator desires to feed data into the system by means of the *normal* mode of operation. He first depresses a key on the keyboard 17 corresponding to the desired character and as shown in FIG. 5, the keyboard emits a *data present* signal to a KB READY flip-flop 104 in the input-output section, causing the flip-flop to be set by the next $E_1$ pulse. As shown in column 2 in Table I, the coincidence of the 111 state with the set condition of the flip-flop 104 and the following $E_1$ pulse causes the sequence unit 98 to switch to the 101 state. The 101 state is a KB→I/O state with a corresponding signal being emitted from an AND circuit 108 (FIG. 5) to the gates 76 (FIG. 4) connecting the keyboard 17 to the input-output register 32. As shown in Table I, column 3, the next execution pulse $E_1$ causes the transfer of the character from the keyboard to the register 32 and also causes the setting of KB RCVD flip-flop 106 (FIG. 5).

More specifically, as shown in FIG. 5, the coincidence of the 101 state with the KB READY signal from the flip-flop 104 and a KB *NOT* RCVD signal from the flip-flop 106, indicating that the keyboard character has not yet been received, cause the AND circuit 108 to emit the KB→I/O signal. This signal is passed by an OR circuit 110 as a LOAD I/O signal which enables an AND circuit 111 (FIG. 4) to pass the next $E_1$ pulse to the input-output register 32. This pulse, applied to all of the flip-flops in the register 32 causes the loading of the register in the manner described above. At the same time, the $E_1$ pulse sets the flip-flop 106 and thereby eliminates the KB *NOT* RCVD signal and provides a KB DATA RCVD signal.

The KB DATA RCVD signal is transmitted to the keyboard 17, which can clear its own character register in response thereto. This eliminates the KB DATA PRES signal, thereby causing an inverter 113 to emit a "reset" signal to the flip-flop 104. The next $E_1$ pulse resets this flip-flop, which then conditions the flip-flop 106 to be reset by the following $E_1$ pulse.

With the flip-flop 102 in the *normal* state, the same pulse that loads the register 32 shifts the sequence unit 98 to the 011 state, as shown in column 3 of Table I. Assuming that the character in the register 32 is not a *normal* or *verify* instruction character, the next pulse $E_1$ shifts the sequence unit to the 010 state. As indicated in column 5 of Table I, the coincidence of this state with an "empty" condition in the hold register 30 results in transfer of the contents of in-out register 32 to the register 30.

More specifically, as shown in FIG. 4, an AND circuit 112 detects the presence or absence of a character in the holding register 30 and emits a corresponding HR EMPTY or HR NOT EMPTY signal. The coincidence of the 010 state of the sequence unit 98 and an HR EMPTY signal during the interval $T_3-T_{25}$ causes an AND circuit 114 (FIG. 5) to emit an I/O→HR signal. This signal enables the gates 84 (FIG. 4) leading from the register 32 to the register 30. By way of an OR circuit 116 it also enables an AND circuit 117 to pass the next $E_1$ pulse to the holding register 30, thereby causing the register to load the digit signals passed by the gates 84.

The same $E_1$ pulse also returns the sequence unit 98 to the 000 stage as indicated in column 5 of Table I and the input-output section is then ready to proceed with the next character from the keyboard 17. In the meantime, the editing controller 16 (FIG. 1) shifts the character from the holding register 30 to the instruction register 34.

If the keyboard operator desires to shift to the *verify* mode of operation, he selects the corresponding key on the keyboard 17 and following the routines set forth in columns 1, 2 and 3 of Table I, the "verify" instruction character is loaded into the input-output register 32. The sequence unit 98 is thus in the 011 state and as indicated in column 6, the coincidence of this state with the presence of the "verify" character in the register 32, as detected by the decoder 96 (FIG. 4) causes the next execution pulse $E_1$ to set the *verify* flip-flop 102 to its "verify" state and return the sequence unit to its 000 state.

The input-output section is now in its *verify* mode. The next DATA PRESENT signal from the keyboard 17 causes the sequence unit 98 to shift to its 101 state as before. However, with the flip-flop 102 in its *verify* state, the next operation is indicated in column 7 of Table I. The character from the keyboard is loaded into the input-output register 32 and the sequence unit is set to the 001 state. Whenever the sequence unit 98 is in this state, the presence of a DISPLAY NOT RCVD signal from a flip-flop 115 (FIG. 5) causes an AND circuit 119 to emit an I/O→COMP signal, as indicated in column 15 of Table I. This signal sets a flip-flop 121 which emits a DISPLAY DATA PRES signal instructing the computer to load into one of its own registers the character in the input-output register 32 (FIG. 4).

The computer 19 acknowledges receipt of the character by transmitting a DISPLAY DATA RCVD signal which sets the flip-flop 115 (FIG. 5). This drops the DISPLAY NOT RCVD signal so that the I/O→COMP signal from the AND circuit 119 to the flip-flop 121 ceases. With the resulting "reset" signal from an inverter 123, the flip-flop 121 is reset by the next $E_1$ pulse. The DISPLAY DATA PRES signal thus ceases and the computer thereupon drops its DISPLAY DATA RCVD signal. Thus, the resulting output of an inverter 127 causes resetting of the flip-flop 115. With the resulting DISPLAY RCVD signal from flip-flop 115, the conditions of column 8 of Table I are met at the time of the next $E_1$ pulse and the sequence unit 98 shifts to its 111 state.

Next, as indicated in column 9, when the computer 19 is ready to retransmit the character to the editing system it sends a COMP DATA PRES signal which sets a flip-flop 118 to provide a COMP READY signal. The flip-flop 118, together with a flip-flop 120, operates in conjunction with the computer 19 in the same manner as the flip-flops 104 and 106 operate in connection with the keyboard 17. With the COMP READY signal from flip-flop 118, the succeeding pulse $E_1$ switches the sequence unit 98 to the 110 state as indicated in column 10 of Table I. The coincidence of the 110 state with a COMP NOT RCVD signal from the flip-flop 120 causes an AND circuit 122 to emit a COMP→I/O signal. As shown in FIG. 4, this signal enables the gates 78 leading from the computer to the in-out register 32. Also, as shown in FIG. 5, it is passed by the OR circuit 110 as a LOAD I/O signal which enables the AND circuit 111 to pass the next pulse $E_1$, thereby loading into the register 32 the character from the computer 19.

At the same time the flip-flop 120 is set, thereby transmitting a COMP RCVD signal to the computer 19. The computer thereupon drops its COMP DATA PRES signal and the resulting output of an inverter 125 causes the flip-flop 118 to be reset by the next $E_1$ pulse.

Also, as indicated in column 10 of Table I, the sequence unit 98 switches to the 011 state and assuming that the character just loaded into the in-out register 32 is neither a "normal" nor "verify" instruction character, operation will continue as indicated in column 4. The character in the in-out register is then transferred to the holding register 30 as indicated in column 5 and the sequence unit then returns to its 000 state for operation on the next character from the keyboard 17.

When the operator desires to return to the *normal* input mode, he depresses the appropriate key on the keyboard 17 and the next character from the keyboard will be the "normal" instruction character. It advances through the same routine as any other character handled in the *verify* mode until the 011 state of the sequence is reached (Table I, col. 10). Then, with this character in the I/O register 32, the conditions of column 11 will obtain and the next $E_1$ pulse will reset the verify flip-flop 102 and return the sequence unit 98 to its 000 state for the next character from the keyboard 17, subsequent operation then being in the "normal" mode.

During the *normal* input mode of operation, with the sequence unit 98 in the 111 state (Table I, col. 1), if the next data signal is received from the computer 19, the conditions of column 9 will be met and the input-output section will then proceed to load the in-out register 32 with the character from the computer. The sequence unit will then index to the 011 state or subsequent operation as described above. Generally, it will operate as indicated in columns 4 and 5. Ordinarily, a computer transmits characters to the editing system only under the direction of the keyboard operator. Therefore the DATA PRESENT signals from th keyboard and the computer will not be present at the same time. If autonomous or semi-autonomous operation of the computer is contemplated, it may be desirable to provide a priority arrangement, so that when both the computer and the keyboard indicate the presence of characters to be transmitted to the editing system, the input-output section can determine whether to operate in accordance with column 2 or column 9 of Table I.

If the operator desires to switch to an *output* mode, he depresses a key which causes an output instruction character to be transmitted to the editing system. This character is processed by the input-output section in the same manner as any other character, so that eventually it reaches the holding register 30 (FIG. 4). It is then shifted to the instruction register 34, as described below, and the decoder 94 emits a corresponding "output" signal. When the sequence unit next reaches the 000 state, the presence of this signal causes the I/O flip-flop 100 to be set to its "output" state. The same $E_1$ pulse that sets the flip-flop 100 shifts the sequence unit to the 100 state.

As shown in FIG. 5, when the AND circuit 124 (FIG. 4) next emits an HR NOT EMPTY signal during the interval $T_3-T_{25}$, indicating that a character to be transmitted from the register 34 has been loaded in the holding register 30, and AND circuit 124 emits an HR→I/O signal as indicated in column 13 of Table I. This signal is passed by the OR circuit 110 as a LOAD I/O signal. As shown in FIG. 4, it also enables the gates 74 leading from the holding register 30 to the in-out register 32. The next $E_1$ pulse is then passed by the AND circuit 111 to load the in-out register 32 with the character in the holding register 30.

The same pulse shifts the sequence unit to the 001 state for operation in accordance with column 15 of Table I. The resulting I/O→COMP signal from the AND circuit 119 sets the flip-flop 121 (FIG. 5) to signal the computer 19 to accept the character in the in-out register. When the computer has received the character, it transmits a DISPLAY DATA RCVD signal setting the flip-flop 115, which thereupon transmits a DISPLAY RCVD signal to the sequence unit 98 (FIG. 5). The sequence unit then returns to the 000 state (Table I, col. 14), and the flip-flop 121 is reset in the manner described above. When the output operation has been completed by the editing system, the output instruction character is deleted by the editing controller 16 (FIG. 1) and the input-output section then automatically returns to an input mode by resetting the I/O flip-flop 100 as indicated in column 1 of Table I.

The checking of the holding register 34 to determine whether or not it is empty (Table I, cols. 5 and 12) is done during the time interval $T_2$–$T_{24}$ for reasons detailed below. This is accomplished, as noted above, by using the $T_2$–$T_{24}$ pulses as inputs for the AND circuits 114 and 124 (FIG. 5). Likewise, the checking of the instruction register 34 to determine whether or not to shift to an *input* or *output* mode (Table I, cols. 1 and 12) is done during $T_2$–$T_{24}$ and an AND circuit (not shown) is similarly employed for this purpose.

MEMORY ADDRESS REGISTER

As shown in FIG. 1, the editing controller 16 includes a memory address register 126 which indicates the address in the memory 12 of each character passing through the access register 20. The register 126 is a counter whose capacity equals the number of character addresses in the memory 12. Its contents are increased by one at the beginning of each time interval $T_0$, the interval during which each address is contained in the register 20. When it reaches its maximum count it resets to zero and begins counting again so that each address passing through register 20 will always correspond to the same identifying number in the address register.

The main purpose of the memory address register 126 is to designate "first" and "last" addresses in the memory 12. For example, during certain operations the editing controller 16 continues to the last address in the memory. Without a signal from the address register 126, the operation would continue without abatement through the first address, which follows the last address into the register 20. Thus, the operation would never end in some cases might result in disruption of characters stored in the addresses following the last address.

MARKER GENERATOR

The marker generator 27 is similar to the memory address register 126 in that it comprises a counter whose capacity equals the number of addresses in the memory 12. Also, its count is increased by one for each timing period $T_0$. After it reaches its maximum count, the next pulse $T_0$ clears it so that it begins counting over again. This occurs once for each complete cycle of the memory 12. Thus, unless an external signal other than a $T_0$ pulse is used to change the content of the marker counter, it will clear itself each time the same memory address becomes accessible through register 20.

The internal signal which clears the marker generator 27 is used as the marker signal which is registered on the cathode ray tube 28 when the tube displays the character contained in that memory address. This signal also synchronizes various operations of the editing controller so that they modify the contents of the same memory address, i.e. the address corresponding to the location of the visible marker signal in the display. Thus, to shift the memory address in which an operation is to take place and correspondingly shift the visible marker on the display, the contents of the marker generator 27 must be changed so that it clears itself when a different memory address passes through the access register 20. In general, this is accomplished by injecting an additional signal adding or subtracting one from the contents of the counter.

More particularly, assume that at the time that the generator 27 is cleared a count of one is added. It will then require one less $T_0$ pulse to reach its maximum count and clear itself again. It will thus clear itself when the memory address in the access register 20 is the one preceding the address for which it previously cleared itself. This has the effect of moving the visible marker signal backward by one space in the page displayed on the cathode ray tube 28. Similarly, by subtracting one from the content of the generator 27, the system advances the marker signal by one space.

A counter which both adds and subtracts is somewhat costlier than one which need only add. Accordingly, the following arrangement is used to reduce the counter content without requiring a subtraction capability in the counter. Instead of clearing itself to zero the counter clears itself to a finite number, e.g. 3. The capacity of the generator 27, i.e. the point at which it clears itself, is then 3 plus the capacity of the memory 12, so that the counter will still clear itself once for each cycle of the memory as explained above. Then, in order to "subtract" one from the content of the marker counter ($MG-1$) when the counter is cleared, the editing controller 16 merely enters a count of two into the counter by means of coincidence circuits contained in the generator 27. Since this reduces the count by one it has the same effect as a subtraction and advances the marker signal as desired.

There is one further way in which the system can change the content of the marker generator 27. It can clear the counter (CLEAR MG) at the same time that the memory address register 126 is cleared, thereby shifting the marker signal to the beginning of the page displayed on the cathode ray tube 28.

EDITING FUNCTIONS

In considering the various operations performed by the editing controller 16, it will be helpful first of all to have in mind the definitions of various terms used in describing these operations. These definitions are as follows:

Page delimiters.—The first and last addresses in the memory 12.

Page.—The characters between two page delimiters, i.e. the entire contents of the memory 12 and ordinarily the entire material displayed on the cathode ray tube 28 at any one time.

Block delimiter.—A *home* character or a page delimiter.

Block.—The characters between two block delimiters. A block is a major subdivision of a page, different blocks in the same page sometimes being displayed in different display units 29 connected into the same editing system. When a page comprises a single block, the first and last memory addresses are the two block delimiters.

Line delimiter.—A display instruction character causing the display unit 29 to shift from one line to another line. These characters are *vertical tab, carriage return, line feed* and the block delimiters.

Field delimiters.—The *horizontal tab* character and the line delimiters.

Field.—Characters between two field delimiters.

The major operations performed by the editing system are TYPE I, TYPE II, DELETE I, DELETE II, INSERT I and INSERT II. In the TYPE operations a character selected on the keyboard 17 is entered into the memory address corresponding to the location of the marker signal of the cathode ray tube screen 28. If there is a character already in this address, it will be replaced by the new character. In the INSERT operations the selected character is inserted between two characters in the memory 12, and to accomplish this without destroying any of the contents of the memory, all the succeeding characters are shifted forward by one address. The DELETE operations, as the term implies, provide for deletion or erasure of selected characters or groups of characters from the memory 12, with the succeeding characters in the memory being shifted backward to fill the resulting spaces. The main difference between the I and II modes of the TYPE, INSERT and DELETE operations concerns the manner in which the instruction characters are handled. In the I mode these characters serve only to determine the memory addresses in which the operations are to take place, whereas in II modes some of the instruction characters are themselves entered into the memory or deleted therefrom. This distinction underlies many of the following definitions of the instructions performed under the six major operations:

TYPE I

*Home (h).*—Move marker to last alphanumeric character in previous block, do not leave page.

*Vertical tab (vt).*—Move marker to first alphanumeric in next block, do not leave page.

*Carriage return (cr).*—Move marker to first alphanumeric in next line, do not leave block.

*Back return (br).*—Move marker to last alphanumeric in previous line, do not leave block.

*Horizontal tab (ht).*—Move marker to first alphanumeric in next field, do not leave line.

*Back tab (bt).*—Move marker to last alphanumeric in previous field, do not leave line.

*Front space (fs).*—Move marker to next alphanumeric character, do not leave block.

*Back space (bs).*—Move marker to previous alphanumeric character, do not leave block.

*Line feed (lf).*—Same as *carriage return.*

*Alphanumeric (an).*—Replace character at marker location and front space, do not leave block.

TYPE II

*Home, vertical tab, carriage return, line feed, horizontal tab,* and *alphanumeric.*—Replace character at marker location and front space, do not leave page.

*Front space.*—Move marker to next character, do not leave page.

*Back space.*—Move marker to previous character, do not leave page.

*Back return.*—Either no action or move marker to previous line delimiter character, do not leave page.

*Back tab.*—Either no action or move marker to previous tab delimiter, do not leave page.

DELETE I

*Home.*—Move marker to start of present block and replace all alphanumeric characters in block with spaces.

*Vertical tab.*—Replace all alphanumeric characters with spaces from cursor to end of block.

*Carriage return.*—Replace all alphanumeric characters with spaces from marker to end of line.

*Back return.*—Move marker to start of present line and replace all alphanumeric characters in line with spaces.

*Horizontal tab.*—Replace all characters from marker to end of field with spaces.

*Back tab.*—Move marker to start of present field and replace all alphanumeric characters in field with spaces.

*Front space.*—Move marker to next alphanumeric character, do not leave block.

*Back space.*—Move marker to previous alphanumeric character, do not leave block.

*Alphanumeric.*—Delete alphanumeric at marker location from field.

DELETE II

*Home.*—Move marker to start of present block and delete block from page.

*Vertical tab.*—Delete, from page, characters from marker location to end of block.

*Carriage return.*—Delete, from page, characters from marker location to end of line.

*Back return.*—Move marker to start of present line and delete line from page.

*Horizontal tab.*—Delete, from page, characters from marker location to end of field.

*Back tab.*—Move marker to start of present field and delete field from page.

*Front space.*—Move marker to next character.

*Back space.*—Move marker to previous character.

*Alphanumeric.*—Delete character at marker location from page.

INSERT I

*Home.*—Same as TYPE I.
*Vertical tab.*—Same as TYPE I.
*Horizontal tab.*—Same as TYPE I.
*Carriage return.*—Same as TYPE I.
*Back tab.*—Same as TYPE I.
*Front space.*—Same as TYPE I.
*Back space.*—Same as TYPE I.
*Alphanumeric.*—Insert character in field at marker location and front space.

INSERT II

*Home, vertical tab, carriage return, horizontal tab,* and *alphanumeric.*—Insert character in page at marker location and front space.

*Front space.*—Same as TYPE II.
*Back space.*—Same as TYPE II.
*Back return.*—Same as TYPE II.
*Back tab.*—Same as TYPE II.

It will be noted that the alphanumeric characters are in a sense also instruction characters in that the editing system reacts in response to the receipt of alphanumeric characters from the keyboard 17 or computer 19. The alphanumeric characters include letters, digits and other symbols. When stored in the memory 12, a null (absence of a character) and the conventional space character are also treated as alphanumeric characters, as are punctuation marks and other displayed symbols. The space character should be differentiated from the *forward space* instruction character. *Forward space* is used to index the marker signal forward by one space in the display. The space character and null character both cause the display unit 29 (FIG. 1) to "display" a blank space, as between words.

The following instruction characters are also display instruction characters which cause the display unit 14 to shift to a new location for display of the next alphanumeric character accessible in the register 20:

*Horizontal tab (ht).*—Advance four spaces in the same line (or can be variable).

*Carriage return (cr).*—Advance to beginning of next line.

*Line feed (lf).*—Advance to next line without changing horizontal position.

*Vertical tab (vt).*—Jump to fourth succeeding line (or can be variable) and resets to beginning of line.

*Alphanumeric.*—Advance one space.

*Home (h).*—Return to beginning of page, i.e. upper left-hand corner of display.

FIG. 8A shows a typical arrangement of alphanumeric and display instruction characters in the memory 12 of FIG. 1, with the characters arranged in the order of their appearance in the access register 20. FIG. 8B shows the corresponding arrangement of the alphanumeric instrution characters in the display provided by the display section 14.

Under the II operational modes there is no way in which the operator can accomplish certain shifts of the marker signal, since the corresponding instructions result in the entering or deletion of characters. For this purpose I have provided the MARKER MOTION operation to which the operator can switch when he desires only movement of the marker:

MARKER MOTION

*Home.*—Move marker to previous home character, do not leave page.

*Vertical tab.*—Move marker to next home character, do not leave page.

*Carriage return.*—Move marker to next line delimiter, do not leave page.

*Back return.*—Move marker to previous line delimiter, do not leave page.

*Horizontal tab.*—Move marker to next tab delimiter, do not leave page.

*Back tab.*—Move marker to previous tab delimiter, do not leave page.

*Front space.*—Move to next character, do not leave page.

*Back space.*—Move marker to previous character, do not leave page.

Alphanumeric.—Same as front space.

I have also provided the following operations which consist of only a single instruction:

*HOME MARKER.*—Move marker to previous block delimiter.

*RESET MARKER.*—Move market to start of page.

*OUTPUT I.*—Move marker to start of present block, output home marker character, followed by TYPE II character, followed by contents of block.

*OUTPUT II.*—Move marker to start of page, output *reset marker* character, followed by TYPE II character, followed by contents of page.

Ordinarily, two characters must be entered into the system in order to perform an editing instruction. First an operation character denoting the operation is entered and this is followed by an instruction character. The operation character is stored in the operation register 40 (FIG. 1) until the operator shifts to another operation. The instruction character is temporarily held in the instruction register 34 and then is either deleted therefrom or shifted upwardly into the memory 12, depending on the nature of the instruction.

With further reference to FIG. 1, identification of the operation requires only five digits of the eight digits assigned to each character. The remaining three digits are therefore used to identify the particular routine being performed. Specifically, the performance of an instruction may involve several routines as explained below, and the system must advance from one routine to the next in order to complete the instruction. The various routines are identifiable by means of a three-digit code used in conjunction with the operation and instruction characters. These three digits are stored in a sub-register 40A and each routine is accordingly identified by the decoder 38 from the contents of the operation register 40 and instruction register 34. The end of each routine is a shift to a new routine if required, and this is accomplished by setting the routine sub-register 40A to the number corresponding to the new routine.

The logic unit 42 consists primarily of a network of coincidence circuits and OR circuits combining the outputs of the decoder 38, the memory address register 126, the marker generator 27, and a character decoder 147 which decodes the contents of the access register 20. The signals developed by the logic unit control the transfer of characters among various registers in the system. Its construction and operation can best be understood by reference to Tables II–XI, which are decision tables similar to Table I. There is a separate table for each operation and, more specifically for each operation character which may be contained in the sub-register 40B of the register 40. In Tables II–XI, the various input conditions are ordinarily sensed during the interval $T_0$, since this is the interval during which each character in the memory 12 is contained in the register 20. The responses to the various conditions are ordinarily initiated by the $E_1$ pulse at the end of $T_0$ (FIG. 2). This timing may be assumed unless otherwise specified.

EDITING CONTROLLER

The manner in which operation and instruction characters are handled by the editing controller 16 will now be described with reference to FIGS. 1, 4 and 6. Assume again that the registers 30, 32, 34 and 36 (FIG. 1) are initially cleared and that the keyboard operator depresses, in succession, the keys which transmit the TYPE I operation character, the *carriage return* character, and an alphanumeric character. The input-output section 10 (FIG. 1) receives these characters in order and first loads the TYPE I character into the holding register 30.

Next, the character is transferred to the instruction register 34. With reference to FIGS. 4 and 6, this HR→IR function is accomplished by using each $T_{25}$ pulse to enable the gates 90 between the registers 30 and 34. This pulse is also passed through an OR circuit 132 to enable an AND circuit 134 to pass an $E_1$ pulse as a LOAD IR pulse to the instruction register 34. At the same time the contents of the instruction register 34 are transferred to the operation register 40, although in this instance the transfer is a nullity.

Nothing further happens until the following interval $T_1$, when the $T_1$ pulse enables the gates 82 leading from the register 34 to the register 30 and also enables the AND circuit 117 by way of the OR circuit 116. The AND circuit 117 passes an $E_1$ pulse to the register 30 as a LOAD HR pulse which initiates an IR→HR transfer. Accordingly, at the end of $T_1$ the contents of the instruction register 34 are returned to the holding register 30. This occurs at the end of every $T_1$ pulse, regardless of operation being performed by the system.

The TYPE I character is thus shuttled back and forth between the registers 30 and 34 and it is in the holding register 30 during each interval $T_2$–$T_{25}$. This is why the input-output section checks only during this interval to see if the register 30 is empty. If it were to be checked during $T_{26}$–$T_1$, when the register is always empty, it might transfer, a character to the register 30 which would be destroyed by the next IR→HR transfer. The shuttling continues until the marker signal appears. This is during a $T_0$ interval and thus at a time when the TYPE I character is in the instruction register 34.

Refer next to Table IIA, which applies because the operation "character" in the operation register is a null. The conditions of column 2 of this table are now met and the $E_1$ pulse at the end of $T_0$ transfer the character from the register 34 (FIG. 1) to the operation register 40 (IR→OPR). Thus, at the end of the succeeding interval $T_1$ there is a null character in the instruction register 34 to return to the holding register 30. At that time the TYPE I character is returned to the instruction register from the operation register 40.

More specifically, as shown in FIG. 4, each $T_1$ pulse enables the gates 92 leading from the register 40 to the register 34. It is also passed by the OR circuit 132 to enable the AND circuit 134 and thus the $E_1$ pulse at the end of $T_1$ is passed by the AND circuit 134 as a LOAD IR pulse, which in this case leads the register 34 with the contents of the register 40.

With reference to FIG. 4, the holding register 30 is now empty during the interval $T_2$–$T_{24}$ and the input-output section can thus load the register 30 with the next character in the input register 32 in the manner described above. It should be noted that the speed of the operation is such that the TYPE I character reached the operation register 40, thereby making the register 30 available for the next character, in substantially less time than the interval between the "typing" of these characters on the keyboard 17.

Column 1 of Table II indicates clearing of the instruction register 34 when any character other than an operation character is in the register 34 during $T_0$ with a null character in the operation character. This prevents "lockup" of the system, which would otherwise occur if the register in the instruction register were not erased.

With the next character, i.e. the *carriage return* character, in the register 30, the $E_1$ pulse at the end of the next pulse $T_{25}$ transfers this character to the instruction register 34 and the TYPE I character from the register 34 to the operation register 40. At the end of the following pulse $T_1$, these characters are returned to the registers 30 and 34, respectively, and this cycle is repeated until the marker signal again appears. At that time, with the TYPE I character in the operation register 40, Table III is applicable.

With the *carriage return* character in the instruction register 34 and assuming that the visible marker is in the middle of a line, the conditions of column 44 of Table III are met. Thus, at the end of $T_0$ the content of the marker generator is reduced by 1 (MG−1). As noted above, this advances the marker one space in the display. Advancing of the marker continues with each $T_0$ until the end of the line is reached as signified by an instruction character in the memory causing the display controller 41 (FIG. 1) to shift the beam in the cathode ray tube 28 downwardly to the next line.

The instruction characters which cause such a shift are *carriage return, line feed* and *vertical tab*. When any one of these appears in the access register 20 at the same time that the marker signal is present, the conditions of columns 10, 37 and 44 are met, with the responses indicated in those columns. Specifically, the marker signal is again advanced (col. 44) and the register 34 is cleared (col. 37, CLEAR IR). This is appropriate since the *carriage return* instruction is no longer needed. At the same time the system shifts to the routine SF (col. 10).

The purpose of the routine SF is to keep advancing the marker signal if the next succeeding character in the memory is a non-displayed character, i.e. a display instruction character causing the display unit 29 to skip more than one space or even to make a further jump downward to another line. Assume, for example, that the next character is another *carriage return*. When the marker signal next appears, the conditions of column 43 will be met and the count in the marker generator 27 will again be reduced by one to advance the marker signal by one address in the memory 12. This response will be repeated until the system finally advances to an alphanumeric character. Then, as indicated in column 4, it will return to routine 0. With no character in the instruction register 34 the system will then idle until a new character is advanced to the instruction register in the manner described above.

The next character to advance to the instruction register is the alphanumeric character which the operator wishes to "type" into the space designated by the marker signal on the cathode ray tube 28. When the signal appears with the new alphanumeric character in the register 34, the conditions of columns 9 and 44 of Table III will be met. Accordingly, the character is transferred from the register 34 to the buffer register 36 (IR→BR) and on into the intermediate shift register 22 (BR→ISR) as indicated in column 9. Also, the marker signal will be advanced one space.

FIG. 7 shows the manner in which a character in the instruction register 34 is transferred to the buffer register 36 and the memory 12. In the first place, the registers 34 and 36 are offset so that the end stage 36a of the buffer register receives the content of the second stage 34b of the instruction register. The content of the stage 34a is fed directly to the shift register 22 by way of an AND circuit 141, an OR circuit 142, an AND circuit 144 and an OR circuit 146. The reason for this is that the editing controller 16 (FIG. 1) senses the various conditions and sets up the appropriate gating during the interval $T_0$, the time in which the memory address into which the character is to be entered is contained in the access register 20. At the end of $T_0$ an $E_1$ pulse causes transfer of the contents of the register 34 to the register 36.

However, this is the time when the right-most bit of the character in the access register 20 is ordinarily shifted to the shift register 22. With the illustrated arrangement, the right-most bit in the register 34 is shifted to the register 22 at the same time that the bit in the register 20 would otherwise be shifted into that register and synchronism is hereby maintained.

The gating arrangement in FIG. 7 is as follows. During normal operation of the memory 12, with the buffer register 36 disconnected from the memory, the contents of the access register 20 are shifted into the intermediate shift register 22 by way of an AND circuit 148 connected to the OR circuit 146. The AND circuit 148 is enabled by the ZERO outputs of flip-flops 150 and 156. Also, the output of the register 26 is fed to the delay line 18 by way of an AND circuit 152 and an OR circuit 154. The AND circuit 152 is enabled by the ZERO output of the flip-flop 156. Again during normal operation, the contents of the buffer register are recirculated by passing the output of the stage 36a through an AND circuit 157, the OR circuit 142, an AND circuit 158 and an OR circuit 160 to the end stage 36i of this register. The AND circuit 157 is enabled by a SHIFT signal emitted by an inverter 164 in the absence of an IR→BR signal. The AND circuit 158 is enabled by the ZERO output of a flip-flop 162.

The IR→BR signal enables gates in the register 36 for parallel transfer from the register 34; the SHIFT signal enables gates providing the shifting operation, as in the arrangement shown in FIG. 3C.

Shifting of the buffer register 36 is provided by the SHIFT signal from the inverter 164.

With further reference to FIG. 7, when the character in the instruction register 34 is to be transferred to the buffer register 36 and the memory 12, the logic unit 42 (FIG. 1) applies an IR→BR signal which enables the gate 141 and disables the gate 157. At the same time a BR→ISR signal from the logic unit 42 enables an AND circuit 166 to pass the $T_0$ pulse to a direct "set" input terminal of the flip-flop 150. The direct input bypasses the input gate of the flip-flop (FIG. 3A) and thus immediately changes the state of the bistable circuit therein without a wait for the next $E_1$ pulse. The output of the flip-flop thus enables the AND circuit 144 and disables the AND circuit 148, thereby disconnecting the access register 20 from the OR circuit 146 while at the same time connecting the OR circuit 142 thereto. Accordingly, the $E_1$ pulse at the end of $T_0$ loads the buffer register 36 with the contents of the register 34 except for the bit in the stage 34a, which is loaded into the end stage of the shift register 22 by the same pulse.

As with most output signals from the logic unit 42, the IR→BR signal ceases at the end of $T_0$ so that during the interval $T_1$ and succeeding intervals, the register 36 is back in its shift mode, the AND circuit 157 is enabled and the AND circuit 141 is disabled. Thus, the $E_1$ pulses at the end of $T_1$ and succeeding intervals shift the contents of the buffer register 36 into the shift register 22 in place of the character, if any, in the access register 20 during this period. The latter character is erased by being shifted out of the end of the register 20.

The last of the nine bits transferred from the instruction register 34 will leave the register 36 at the end of the interval $T_8$. Accordingly, the $T_8$ pulse is applied to the "reset" input terminal of the flip-flop 150 so that at the end of this pulse the flip-flop is reset, thereby connecting the access register 20 to the OR circuit 146 and disconnecting the buffer register 36 therefrom. Thus, at the end of the next interval $T_9$ and succeeding intervals, bits from the access register 20 are fed to the shift register 22. The first of these is the first bit in the character in the memory 12 immediately following the character replaced by the typing operation.

The TYPE I operation continues as long as the keyboard operator desires, with Table III setting forth the ultimate responses of the system to the depression of various keys on the keyboard 17 (FIG. 1). Eventually, the operator will desire a different operation and he will depress a keyboard button to transmit the corresponding operation character. This character will reach the instruction register 34 and as indicated in column 13 of Table III, it will then be transferred to the operation register 40. Further operation will then be in accordance with the new operation character.

Assume that the operator desires to insert an alphanumeric character in the second space in the next line. The new operation character is therefore the INSERT I character. It is followed by the *carriage return* character. The conditions of column 23 of Table IV are then met and the marker signal is advanced one space. This routine continues until the marker signal reaches a character indicating a shift to the next line: the conditions of columns 13, 23 and 36 are then met. The marker signal is advanced (col. 23), the *carriage return* character is cleared from the instruction register 34 (col. 26), and the editing controller shifts to routine SF (col. 13). In routine SF the marker signal is advanced as long as it coincides with the appearance, in the access register 20, of instruction characters corresponding to a shift to another line in the display (col. 22). When the marker signal finally reaches an alphanumeric character, the conditions of column 43 are met and the system shifts back to the routine 0, where it idles until the next character reaches the instruction register 34.

The next character from the keyboard is a *front space*. The conditions in columns 12 and 31 are thus met when the marker signal next appears. The *front space* character is cleared from the instruction register 34 (Table IV, col. 36), the marker signal is advanced one space (col. 12) and the editing controller shifts to routine SF (col. 12). The routine SF again has the purpose of advancing the marker signal past the nondisplayed characters in the memory, i.e. the instruction characters therein except for *front space*. In this case assume that the next character is another alphanumeric character. Column 43 then applies and the system returns to routine 0.

With the marker signal now positioned at the location in the display where the operator desires to insert an alphanumeric character, he depresses the appropriate key on the keyboard 17 (FIG. 1) and the character is then passed along to the instruction register 34. With the next appearance of the marker signal the conditions of columns 21, 23, 35 and 31 are met. Thus, the character is transferred from the instruction register 34 to the buffer register 36 (IR→BR) (FIG. 7), the buffer register 36 is connected through to the shift register 22 (BR→ISR) and the output of the access register 20 is connected to the input of the buffer register 36 (ACR→BR) (Table IV, col. 25). At the same time the character is cleared from the instruction register 34 (col. 31); the marker signal is advanced by one space (col. 23); and the system shifts to routine I (col. 21).

Referring next to FIG. 7, the BR→ISR signal once more sets the flip-flop 150 to connect the buffer register 36 to the shift register 22. The IR→BR signal again transfers from the register 34 to the register 36 the character to be inserted into the memory 12. Additionally, an ACR→BR signal developed by the logic unit 42 (FIG. 1) enables an AND circuit 168 to pass the $T_0$ pulse to the direct "set" input terminal of the flip-flop 162. The flip-flop immediately changes states to disable the AND circuit 158 and enable an AND circuit 170 between the output stage of the access register 20 and the input stage 36$i$ of the buffer register 36.

Thus, beginning at the end of the interval $T_0$, the character in the instruction register 34 is transferred to the register 36 and on into the shift register 32 in place of the character in the access register 20. This sequence is the same as that of the TYPE I operation discussed above. However, the character in the access register 20 is not erased but rather moved into the register 36 behind the character to be inserted in the memory 12. The pulse $E_1$ at the end of the interval $T_8$, which shifts the last bit of the inserted character into the shift register 22, also shifts the last bit of the replaced character into the buffer register 36. The same pulse resets the flip-flops 150 and 162, thereby reconnecting the access register 20 to the shift register 22 and causing the contents of the register 36 to recirculate within the register 30. During the next eighteen time intervals, i.e. $T_9$–$T_{26}$, the next two characters in the memory 12 are shifted into the register 22.

Returning to Table IV, the conditions of column 26 will be met during the next interval $T_0$, i.e. when the next memory address enters the access register 20. Once again the BR→ISR and ACR→BR signals are emitted. As shown in FIG. 7, these signals again set the flip-flops 150 and 152, thereby causing the character in the buffer register 36 to be shifted to the intermediate shift register 22, with the character in the access register 20 being shifted into the register 36. Thus, the character originally replaced by the inserted character has been advanced one space in the display, i.e. into the next memory address after the one occupied by the inserted character; the character which was in the latter address has been loaded into the buffer register 36. It should be noted that since recirculation of the character in the buffer register is synchronized with the timing sequence, the first bit of the character stored in this register is in the stage 36$a$ during the interval $T_0$, so that the character is in the right order for shifting into the register 22 at the end of $T_0$.

With the second displaced character now circulating in the buffer register 36, operation continues in accordance with column 26 of Table IV so that successive characters are advanced one space in the display, until the end of the line is reached. The conditions of column 28 are then met and the editing controller shifts back to routine 0 where it idles until the next character arrives in the instruction register 34. When a new operation character is selected, it eventually reaches the instruction register 34 and operation is then governed by column 43 of Table IV. The character is thus transferred to the operation register 40.

Assume that the operator desires to delete the entire line in which the marker signal is located. From the foregoing definitions of operations and instructions, it is seen that the operation character will be the DELETE II character and that this should be followed by a *back return* (*br*) instruction character. The system responses are therefore governed by Table IX. Row 1 of FIG. 8C illustrates a typical arrangement of characters in the memory addresses corresponding to the line to be deleted and part of the next line.

After the *back return* character has reached the instruction register 34, the next appearance of the marker signal completes the conditions of column 7 of Table IX. The marker signal is thus moved back one space along the line (MG+1). This is repeated until the marker signal reaches the memory address containing the instruction character corresponding to the beginning of the line, i.e. the first *carriage return* character in FIG. 8C. Column 8 of Table IX applies and the system therefore shifts to routine D.

The system then functions in accordance with column 17 of Table IX. The presence of the marker signal is not one of the required conditions in this column, and thus the first response under routine D takes place at the end of the next interval $T_0$ following the interval in which the marker signal was present.

From FIG. 7 it will be apparent that during the twenty-seven microsecond interval between the marker signal and the next $T_0$ interval, the *carriage return* character in the access register 20 at the time of the marker signal will have progressed to the register 22, then the register 24 and finally the register 26. The character immediately following the carriage return character is now in the register 20. As indicated in column 17 of Table IX, the logic unit 42 (FIG. 1) now emits an ACR→DL signal which provides direct transfer from the access register 20 to the delay line 18.

More specifically, as shown in FIG. 7 the ACR→DL signal enables an AND circuit 172 to pass the $T_0$ pulse to the direct "set" input terminal of the flip-flop 156. This sets the flip-flop, thereby disabling the AND circuit 152 and enabling an AND circuit 174 between the access register 20 and the OR circuit 154. Thus, the $E_1$ pulse occurring at the end of $T_0$ will shift the first bit of the character in the register 20 directly into the delay line 18 and succeeding $E_1$ pulses will shift the remainder of the character into the delay line. This character thus replaces the carriage return character, which is erased by being shifted out of the register 26. Specifically the character G (FIG. 8C) leaving the register 20 is entered into the address formerly occupied by the *carriage return* character and thus it is in the address corresponding to the marker signal. Setting of the flip-flop 156 also disables the AND circuit 148 so that nothing is shifted into the register 22 during the interval in which the output of the access register 20 is fed directly to the delay line 18.

The last bit of the character entering the delay line 18 directly from the register 20 is shifted out of the register at the end of $T_8$ and therefore the flip-flop 156 is reset at this time so as to reconnect the shift register 26 to the delay line 18 and disconnect the access register 20 therefrom. The register 20 is reconnected to the register 22.

At this time the register 22 contains a blank "character" and thus the order of characters in the memory is as shown in row 2 of FIG. 8C.

With routine D still in effect (Table IX, col. 17) the foregoing response is repeated at the end of the next interval $T_0$, i.e. when the next memory address is contained in the access register 20. Referring to FIG. 7 the blank character in the intermediate shift register 22 has shifted into the register 26 and it about to pass therefrom into the delay line 18. However, with the access register 20 being connected to the delay line instead, the character H therein (FIG. 8C) is advanced along the memory by one address, corresponding to a backward shift of one space in the display, thereby replacing the blank character. At the same time another blank character is entered into the register 22 in place of the character in the access register 20 which would otherwise have entered the register 22. The arrangement of the characters now corresponds to row 3 of FIG. 8C.

Thus, the characters in successive memory addresses are shifted up by one address to fill in the space left by the deletion of the *carriage return* character. This routine continues until the last memory address is reached, with the charaters then being arranged as in row 4 of FIG. 8C. At that point, as indicated in column 18 of Table V, the system shifts to routine S.

As pointed out above, the alphanumeric character G is now in the memory address corresponding to the marker signal (FIG. 8C, row 4). Thus, column 20 of Table IX is applicable and as indicated therein, the editing controller 16 (FIG. 1) responds by shifting back to routine D. Thus, with the next succeeding interval $T_0$, column 17 applies and the ACR→DL signal is emitted.

Referring again to FIG. 7, the character G is now in the register 26 and the character H is in the access register 20. Thus, when the ACR→DL signal sets the flip-flop 156, the character H is fed directly to the delay line 18, thereby replacing the character G, and at the same time a blank character is inserted into the intermediate shift register 22. The character H is then in the memory address corresponding to the marker signal. The memory arrangement is thus indicated in line 5 of FIG. 8C. As indicated in column 17 of Table IX, the ACR→DL signal is emitted again in the next interval $T_0$, when the blank character is in the register 26 and the character J in the register 20. The character J is therefore moved up one address, leaving a blank character in its position.

This routine continues until all the succeeding characters in the memory have moved up by one address and the last address is reached. In accordance with column 18 of Table V, the system thereupon shifts to the routine S again and from the routine S it returns to the routine D (Table IX, col. 20). It then deletes the character H and moves up the succeeding characters. This sequence continues through the succeeding alpha-numeric characters until the *carriage return* character in line 5 of FIG. 8C is advanced to the address corresponding to the marker signal and the succeeding characters have been moved up to fill in the space created thereby. Then, when the system shifts to routine S in accordance with column 18 of Table IX, the conditions of column 21 will be met when the marker signal next appears. The system thus clears the instruction register 34 and shifts to routine 0 where it idles until the next character is entered into the instruction register. If the new character is an operation character, the response of the system will be governed by column 2 of Table IX, and the character will be transferred to the operation register.

Assume that the OUTPUT II operation character has been loaded into the operation register 40 so that operation of the system is governed by Table X. Since each operation begins with routine 0, the conditions of column 1 of this table are met when the first memory address enters the access register 20 (FIG. 1) and the marker generator 7 (FIG. 1) is cleared by a CLEAR MG signal. As noted above, this makes the marker signal correspond to the first address. At the same time the editing controller 16 shifts to routine N and enters the RESET MARKER operation character into the instruction register 34. Thus, when this character is transferred to the holding register 30 at the end of the next interval $T_1$, the input-output section 10 will transfer it to the in-out register 32 and then to the computer 19.

The response for routine N are indicated in column 2 of Table X. At the end of the next interval $T_0$ the system enters the TYPE II instruction character into the instruction register 34, emits a DL→BR signal and shifts to routine KO. Thus, the TYPE II character is also passed down to the input-output section and on to the computer 19.

As shown in FIG. 7, the DL→BR signal sets a flip-flop 176. The ONE output of this flip-flop enables an AND circuit 178 to pass the output of the delay line 18 to the input stage 36$i$ of the buffer register 36; the lack of a ZERO output disables the AND circuit 158, thereby interrupting recirculation of the buffer register contents. Accordingly, the buffer register now has the same input as the access register 20 and during each interval $T_0$ it contains the character which is accessible in the register 20.

With the system now operating in routine KO, the functions of column 3 will be performed. When the marker signal next appears, i.e. when the character in the first memory address is contained in the access register 20 and the buffer register 36, the logic unit 42 (FIG. 1) emits a BR→IR signal and advances the marker signal by one address. As shown in FIG. 4, the BR→IR signal enables the gates 88 leading from the buffer register 36 to the instruction register 34. It also enables the AND circuit 134 to pass a pulse $E_1$ at the end of the interval $T_0$ when the BR→IR signal is present. Thus, the character in the first memory address is passed to the instruction register 34 and, in the manner described above, it is then transferred to the holding register 30 at the end of the next interval $T_1$ to be picked up by the input-output section and transmitted to the computer 19.

As shown in FIG. 7, the stages of the buffer registers 36 and 34 are in line rather than offset for the BR→IR transfer. This is because the reason for the offset, i.e. necessity of transferring from the register 34 to the register 36 while at the same time shifting to the right, does not apply to the downward transfer to the instruction register.

Returning to Table X, the marker signal appears again as soon as the character in the next, i.e. second, memory address is in the access register 20 and the buffer register 36. Therefore, the BR→IR transfer again takes place and the marker signal is advanced to the next memory address. In this fashion the system feeds the characters in the successive memory addresses to the computer 19 until the last address is reached. Then, as indicated in column 4 of Table X, the character in the last address is transferred in the manner just described, and at the same time the system clears the operation register 30 (CLEAR OPR). As noted above in connection with the description of the input-output section, this returns the latter section to an *input* mode, so that the next operation character can be fed into the system. As shown in FIG. 7, the CLEAR OPR signal resets the flip-flop 176, thereby disabling the AND circuit 178 and enabling the AND circuit 158 to return the buffer register 36 to its normal recirculating mode of operation.

One of the required conditions in column 3 of Table X is the presence of an "other" character in the instruction register 34. In general this is a null "character," i.e. the register is cleared. One of the listed characters (Table X) will be in the instruction register only if there has been a delay in transmitting the character from the system. In such case, if the next character to be transmitted is brought down from the memory, the character in the instruction register will be obliterated. Accordingly, if there is not a null in the register 34, the system idles until the null condition is met.

The reason for transmitting the RESET MARKER and TYPE II operation characters prior to sending out the contents of the memory 12 will be understood by considering the desired operational sequence if the computer receiving this data is to return it to the editing system or to another editing system of the same type at a later time. In order to store the data in the right order in the memory 12, the first character should be returned to the first memory address. This is accomplished by the RESET MARKER operation, which clears the marker generator 7 (FIG. 1), so that the marker signal coincides with access to the first memory address. The TYPE II character results in the proper operation for entering into the memory 12 both the display characters and display instruction characters previously transmitted to the computer.

DISPLAY SECTION

With reference to FIG. 1, the display controller 41 makes use of a decoder connected to the access register 20 and a logic unit containing coincidence circuits responsive to signals from the decoder and the marker generator 7. To avoid duplication of circuitry, output signals of the character decoder 147 are used by the display section 14. As noted above, one of the functions of the controller 41 is to change the contents of the space counter 46 and line counter 44, so as to shift the beam in the cathode ray tube 28 horizontally from one space to the next and vertically from one line to the next. In accordance with the foregoing definitions of the display instructions, the controller 41 changes the contents of the counters 44 and 46 as follows when the corresponding characters appear in the access register 20:

Alphanumeric (including space and null).—Add 1 to space counter 46.

*Horizontal tab.*—Add 4 to space counter.

*Line feed.*—Add 1 to line counter.

*Carriage return.*—Clear space counter, add 1 to line counter.

*Vertical tab.*—Add 4 to line counter, clear space counter.

*Home.*—Clear space and line counters, i.e. return to beginning of page.

These operations are all performed at the end of interval $T_0$. Also, the character in the access register 20 is transferred to the character register 43 at this time.

Figure 9:
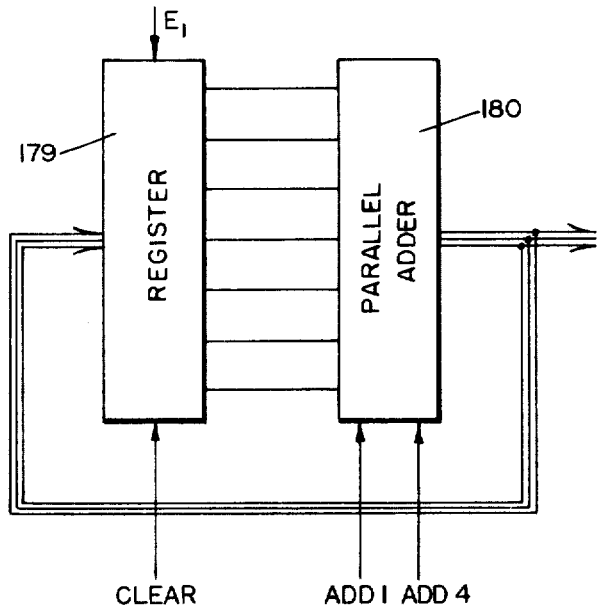
FIG. 9 is a diagram illustrating a circuit which may be used for the space and line counters in the system of FIG. 1.

A convenient arrangement for the counters 44 and 46 is illustrated in FIG. 9. A register 179 containing the space or line count is connected to the input of a parallel adder 180. Each of the output terminals of the adder is connected to the input terminal of the corresponding stage of the register 179. Lines carrying ADD 1 and ADD 4 input signals are connected to appropriate terminals in the adder, so that the parallel output of the adder corresponds to the sum of the count in the register 179 and the number to be added according to the input on one or the other of these lines.

In the absence of an ADD 1 or ADD 4 input signal, the output of the adder 180 equals the content of the register 179. Accordingly, there is no change in the register content as a result of the application of $E_1$ pulses to the register as described above in connection with FIG. 3. However, when one of the ADD signals appears, during the interval $T_0$, the output of the adder 180 is changed accordingly and the next $E_1$ pulse causes the register 179 to record the sum. The CLEAR signal is applied to the reset input terminals of the flip-flops in the register 179.

Figure 10:
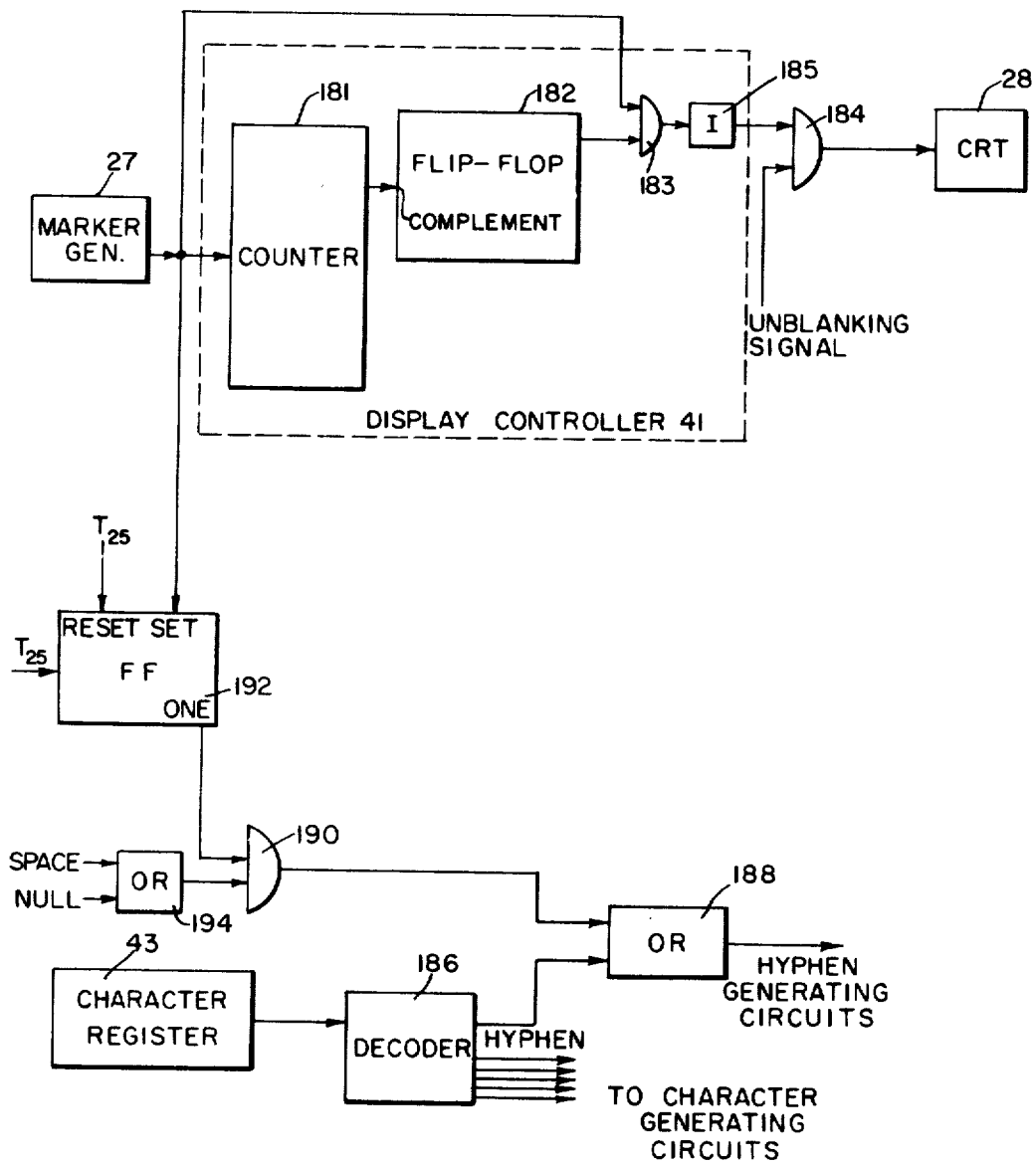
FIG. 10 is a diagram of the circuitry involved in generation of the visible marker signal in the display unit.

Preferably, the visual marker signal takes the form of a blinking of the character in the corresponding location on the face of the cathode ray tube 28. The manner in which this is accomplished is shown in FIG. 10. The display controller 41 includes a counter 181 which counts the signals from the marker generator 27. Illustratively, the counter 181 may have a capacity of 16, so that on every 16th signal from the marker generator 7 it clears itself and transmits a signal to the complement input of a flip-flop 182. The output of the flip-flop is combined in an AND circuit 183 with the marker signal and after inversion by an inverter 185, the resulting signal is combined in an AND circuit 184 with the unblanking signal for the cathode ray tube 28.

Accordingly, each time the display section 14 (FIG. 1) generates the character corresponding to the marker signal, the marker generator 27 emits a signal counted by the counter 181. When 16 such signals have been counted, i.e. the character has been displayed 16 times, the flip-flop 182 is reset, thereby enabling the AND circuit 183, and consequently disabling the AND circuit 184 when the marker signal is present. This prevents the unblanking signal from reaching the cathode ray tube 28. Thus it precludes display of the character until 16 more signals from the generator 7 have been received, at which time the flip-flop 182 is set, thereby disabling the AND circuit 183 and again enabling the AND circuit 184 even when the marker signal is present. Thus, the character is "on" for 16 frames of the display on the cathode ray tube 28 and then "off" for 16 frames. This provides a perceptible blinking of the character so that the operator can readily determine the location of the marker signal.

The foregoing arrangement must be supplemented in cases where the marker signal corresponds to a blank space on the display, since there is then no character to blink on and off. As shown in FIG. 10, the display unit 29 includes a decoder 186 provided with an output terminal for each possible displayed character. These terminals are connected to character generating circuits (not shown) which are thus activated to generate on the cathode ray tube 28 the various characters contained in the register 43. The output terminal for one of these characters, e.g. the hyphen, is connected to the character generator circuits through an OR circuit 188. The other input of the OR circuit 188 is the output of an AND circuit 190. One input of the AND circuit 190 is the ONE output of a flip-flop 192 which is set by the marker signal from the generator 27. The other input for the AND circuit is the output of an OR circuit 194 which receives "space" and "null" signals from the decoder 186.

The marker signal causes the setting of the flip-flop 192 at the end of each interval $T_0$ and the flip-flop is reset at the end of the next interval $T_{25}$. Thus, the AND circuit 190 is enabled during each timing cycle in which the character corresponding to the marker signal is displayed. Moreover, it is enabled throughout that portion of the cycle in which the character is actually generated on the cathode ray tube 28. If, during this interval, the display unit 29 would ordinarily leave a blank space, as provided by the presence of either a space character or a null in the character register 43, an output from the AND circuit 190 will be passed to the hyphen generating circuit so that a hyphen will be displayed in that space. At the same time, the blinking function provided by the counter 180 continues to operate, so that the hyphen blinks on and off to provide the desired visual indication.

The visual form of the marker signal need not, of course, be a blinking of the corresponding character. For example, the display unit 29 might be programmed to insert an underline beneath the character, in which case no special provision would have to be made for blank spaces.

DISPLAY SECTION

Figure 11:
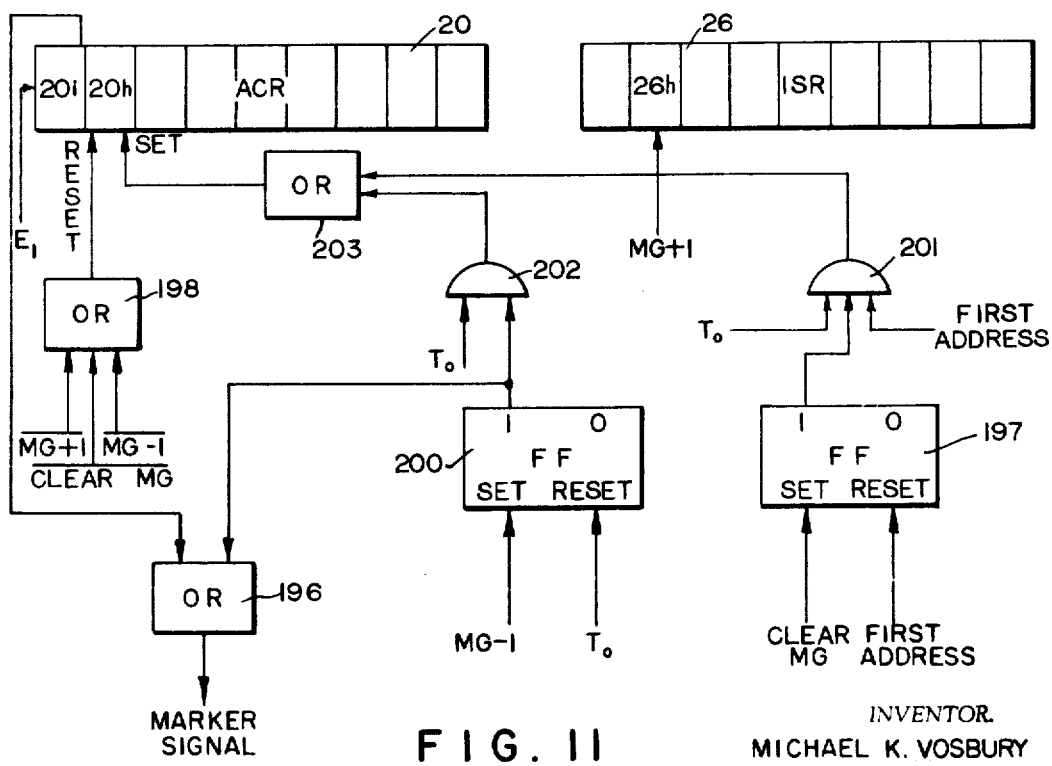
FIG. 11 illustrates a variation of the generator used to develop the marker signal in the system.

Instead of using a counter for the marker generator 27 as described above, one may employ the ninth bit in the character code. In the foregoing discussion it was mentioned that this was a spare bit. It can be used to indicate the presence or absence of the marker signal. Thus, the character corresponding to the marker signal may have a ONE for this bit and all the other characters in the memory 12 may have a ZERO. The system may then be arranged as shown in FIG. 11 to develop the electrical marker signal whenever the character in the access register 20 (FIG. 1) has a ONE for the ninth or "marker" bit. This signal is then used by the visible marker circuits described above in the same manner as the signal from the marker generator 27.

FIG. 11 shows the manner in which the marker signal is developed and shifted forward or backward when a marker generator employing the spare bit is used. Assume that this bit is the last bit in the character and thus is in the stage 20$i$ when the character is in the access register 20. The ONE output of the flip-flop in this stage, as passed through an OR circuit 196, is then the marker signal. When the signal is to be shifted forward or backward or reset to "first address," the MG+1, MG−1 or clear MG signal is applied through an OR circuit 198 to the reset input terminal of the access register stage 20$h$. This signal is developed during the interval $T_0$ and therefore it forces a ZERO into the stage 20$h$ during the interval $T_1$ when a ONE from the stage 20$i$ would otherwise be transferred into this stage. A convenient way of arranging this function is to use the output of the OR circuit 198 to disable the gate between the stages 20$i$ and 20$h$ (see FIG. 3C).

If the marker signal is to be advanced one space in the display, corresponding to a shift to the next memory address to pass into the access register 20, the MG−1 signal is applied to the "set" input terminal of a flip-flop 200 whose ONE output signal then enables an AND circuit 202. During the next interval $T_0$, when the next address is in the register 20, the AND circuit 202 applies a signal through an OR circuit 203 to the "set" input terminal of the flip-flop in the stage 20$h$ and at the end of the interval, the pulse $E_1$ causes a ONE to be loaded into that stage. The same timing pulse $T_0$ resets the flip-flop 200.

The ONE output of the flip-flop 200 is also fed to the OR circuit 196. This is because when the marker signal is to be advanced, it is added to the new character after the character has begun to leave the register 20. Thus, if only the output from the stage 20$i$ were used to develop the marker signal, there would have to be an additional recirculation of the memory before an operation could be performed in the new address of the marker signal.

Still referring to FIG. 11, if the marker signal is to be moved ahead in the memory, the MG+1 signal is applied to the "set" input terminal in the stage 26$h$ in the register 26, which contains the address previously contained in the register 20.

The marker signal may also be developed by a special character which is decoded to provide the signal. Thus, when this character is passed through the access register 20 (FIG. 1), a flip-flop is set to permit certain operations in the next address to pass through the access register. The position of the marker signal can then be changed by exchanging its address with that of the character preceding or following it in the memory 12.

ALTERNATIVE MEMORY TRANSFER ARRANGEMENT

Figure 12:
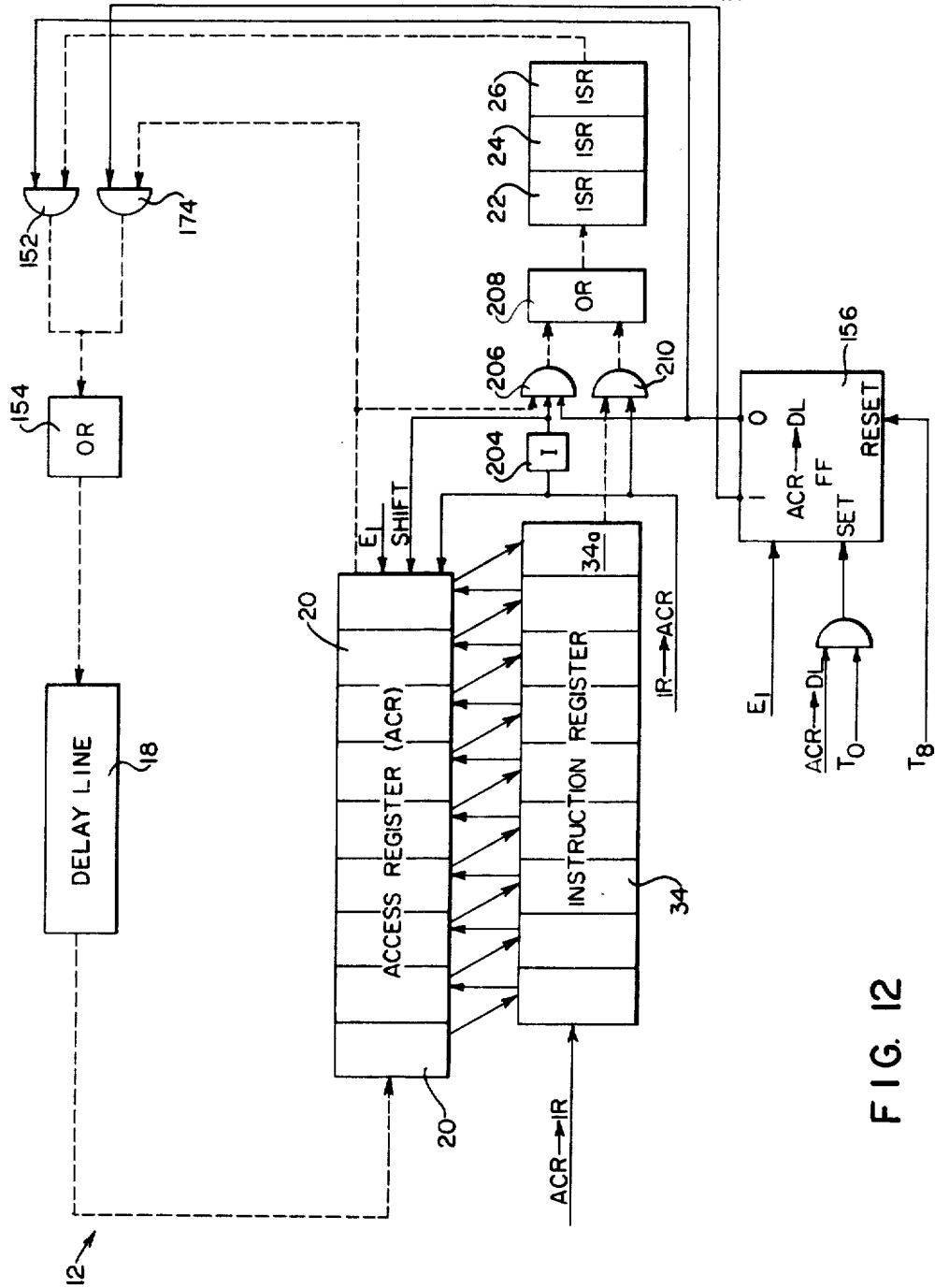
FIG. 12 is a schematic diagram of another arrangement which may be used in transferring characters to and from the memory.

FIG. 12 illustrates an alternative arrangement for transferring characters into and out of the access register 20. The buffer register 36 of FIGS. 1 and 7 has been eliminated to provide for direct transfer between the instruction register 34 and the access register 20. The stages in the register 20 are thus provided with gates permitting either a shift to the right with each pulse $E_1$ or parallel loading from the register 34 as shown. The gates used for shifting are enabled by the output of an inverter 204 in the absence of an IR→ACR signal. When the access register shifts, the bit in the end stage 28 thereof is passed to the intermediate shift register 22 by way of an AND circuit 206 and an OR circuit 208. The AND circuit 206 is enabled by the SHIFT signal from the inverter 204 and a ZERO signal from the flip-flop 156.

When a character in the instruction register 34 is to be entered into the memory 12, the IR→ACR signal is emitted by the logic unit 42 (FIG. 1) to enable the gates in the register 20 connected to the register 34 and disable the gates providing the shift function, so that at the end of the interval $T_0$ the character in the instruction register is loaded into the access register. Again, in order to transfer the bit in the end stage 34$a$ to the register 22 at the end of the interval $T_0$, when a bit in the stage 20$a$ would otherwise be transferred thereto, the stages in the register 34 are offset from the stages in the register 20. The output of the stage 34$a$ thus passes to the OR circuit 208 and shift register 22 by way of an AND circuit 210 enabled by the IR→ACR signal. At the same time this signal disables the AND circuit 206.

With further reference to FIG. 12, transfer from the access register 20 to the instruction register 34 is accomplished by means of an ACR→IR signal applied to the gates 88 (FIG. 4), which in this case lead from the register 20 to the register 34. For this transfer the two registers are not offset, as indicated by the arrows in FIG. 12.

Thus, in a TYPE routine in which a character in the instruction register is to be transferred to the memory, the logic unit 42 (FIG. 1) need provide only the IR→ACR signal instead of the IR→BR and BR→ISR signals used in the circuit of FIG. 7 (see e.g., Tables 3 and 4). In the INSERT routine I, the logic unit emits both the IR→ACR and ACR→IR signals so as to swap the contents of the two registers. Thus, when the character to be inserted is entered into the memory, the character displaced thereby is transferred to the instruction register. At the end of the next interval $T_0$, the displaced character is transferred from the instruction register to the memory in exchange for the character in the next memory address. These are the only modifications required in the decision tables when the circuit of FIG. 12 is employed, except that the instruction register 34 should not be cleared until the end of the INSERT routine, i.e. when the last address is reached.

With the arrangement of FIG. 12, the DELETE operations are accomplished as before by means of the flip-flop 156. The OUTPUT operations make use of the ACR→IR signal rather than the separate DL→BR signal required in the circuit of FIG. 7.

OVERLAY OPERATION

The home character ($h$) has somewhat different meanings for the display and editing functions. From the foregoing definitions it is seen that in the editing functions it is used as a block delimiter confining certain of these functions to the blocks in which they are initiated. The display section 14, on the other hand, responds to this character by returning to the beginning of the page. This provides a novel overlay feature by which the contents of two or more blocks in the memory 12 may be displayed in the same area on the cathode ray tube 28.

The overlay capability will be better understood by considering the simple example illustrated in FIGS. 8D–8G.

Assume that FIG. 8D shows the contents of the memory 12. Then as the first block in the memory, i.e. the addresses between the two *home* characters, passes through the access register 20 of FIG. 1, the display unit 29 will display the contents of this block as shown in FIG. 8E. The second *home* character causes the display unit to return to the beginning of the page, and therefore, the return to the beginning of the page and therefore, the second block in the memory is displayed as shown in FIG. 8F. Now the memory cycle is fast enough to provide the illusion of continuous and simultaneous display of both blocks of characters. Accordingly, what the observer sees is the arrangement shown in FIG. 8G, i.e. the overlay of FIGS. 8E and 8F.

The overlay feature affords a substantial saving in data transmission time and data storage capacity. Thus, in the example of FIGS. 8D–8G, a catalog of names, addresses and ages might be stored in a computer memory. The "format block" of FIG. 8E need only be recorded in one location, with "data blocks" such as in FIG. 8F occupying the rest of the memory. The keyboard operator can then call up the format block for storage in the memory 12 (FIG. 1) and then he can call up individual data blocks for editing and retransfer to the computer. Alternatively, he might enter new data blocks into the memory 12 and then transmit them to the computer. In both cases there is a considerable saving in transmission time because the redundant "format block" need be transmitted only once.

TIME SHARING

Figure 13:
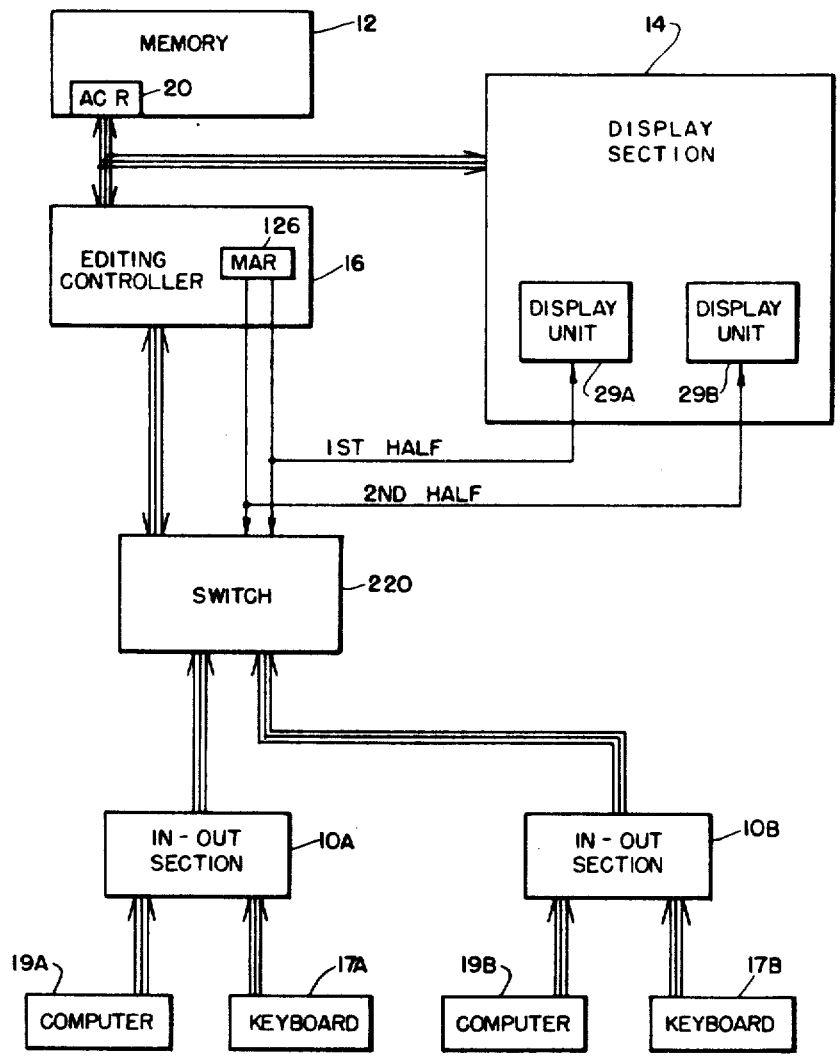
FIG. 13 is a schematic diagram of a time sharing arrangement in which inputs are derived from a plurality of sources.

The editing system is well suited to a time sharing ararngement involving several input devices and corresponding display units. One arrangement of this type is illustrated in FIG. 13. A pair of keyboard-computer combinations 17A–19A and 17B–19B are connected to separate input-output sections 10A and 10B having the same construction as the section 10 of FIG. 1. The input-output sections are alternately connected to the editing controller 16 by way of an intervening switch 220. The display section 14 includes a pair of display units 29A and 29B associated with the respective keyboards 17A and 17B.

By way of example, the first half of the memory 12 may be assigned to the keyboard 17A and the second half to the keyboard 17B. The switch 220 then connects the input-output section 10A to the editing controller 16 during the interval that the first half of the memory addresses passes through the access register 20 and then switches to the section 10B for the second half. The switch may be controlled by the output of a decoder in the memory address register 126, which emits "first half" and "second half" signals.

As noted above, the memory address register 126 also emits "first address" and "last address" signals which define the bounds of certain of the editing functions. When the memory 12 is shared by several users, these signals should define the limits of the portions of the memory assigned to the respective users. Thus, when the "first half" signal is present, the "first address" signal coincides with the first memory address and the "last address" signal corresponds to the end of the first half of the memory. Similarly, when the "second half" signal is present, the "first" memory address is the first address in the second half of the memory and the "last" address is the actual last address.

The "first half" and "second half" signals are also used in the unblanking circuits in the display units 29A and 29B, so that each display unit can be unblanked only when the corresponding portion of the memory is passing through the access register 20. With this arrangement the display units can be connected in parallel to the rest of the units in the display section 14.

With a time sharing scheme of this nature, one may in effect obtain the use of a number of complete systems without duplicating the editing controller, the memory and a large portion of the display section 14. Yet, since the editing functions are performed much faster than one can use a keyboard, each keyboard operator obtains essentially instantaneous service. The same principle can, of course, be extended to three or more keyboards and corresponding display units.

With the system of FIG. 13 it is preferable to use the "marker bit" type of marker generator as illustrated in FIG. 11, since this automatically accommodates the system to the use of a separate marker signal in each section of the memory 12. If a counter type of marker generator is used, there must be a separate one for each display unit.

FIG. 13 also illustrates the reason for returning the operation character from the register 40 (FIG. 1) to the instruction register 34 and shifting the character in the instruction register to the holding register 30 at the end of each interval $T_0$, and then shifting them back at the end of the interval $T_{25}$ for use in the editing functions. When they are thus stored in the input-output section 10A, for example, the system can switch to the input-output section 10B without losing track of the operation it is performing for the keyboard 17A. Then, when the system switches back to the section 10A, it resumes operation at the very point at which it was interrupted. In fact, an operation may even be interrupted in the middle of a routine and then picked up again at the interrupting point when the switch 220 (FIG. 13) returns to the input-output section where the instruction character, operation character and routine character are temporarily stored.

The overlay feature may be combined with the time sharing arrangement of FIG. 13 and a particularly useful arrangement of this type is as follows. The memory 12 is divided into three sections, the first section containing the format block, the second section containing the data block for the keyboard 17A and the third section the data block for the keyboard 17B. The memory address register 126 provides output signals suitable to this arrangement and in particular it permits unblanking both the display units when the first section of the memory 12 passes through the access register 20, so that both units display the format block. The unblanking is further arranged so that each display unit displays only the data block corresponding to the keyboard associated with it. This avoids duplication of the format block, with a consequent saving in memory space, when several keyboard operators are to operate with the same format block.

Figure 14:
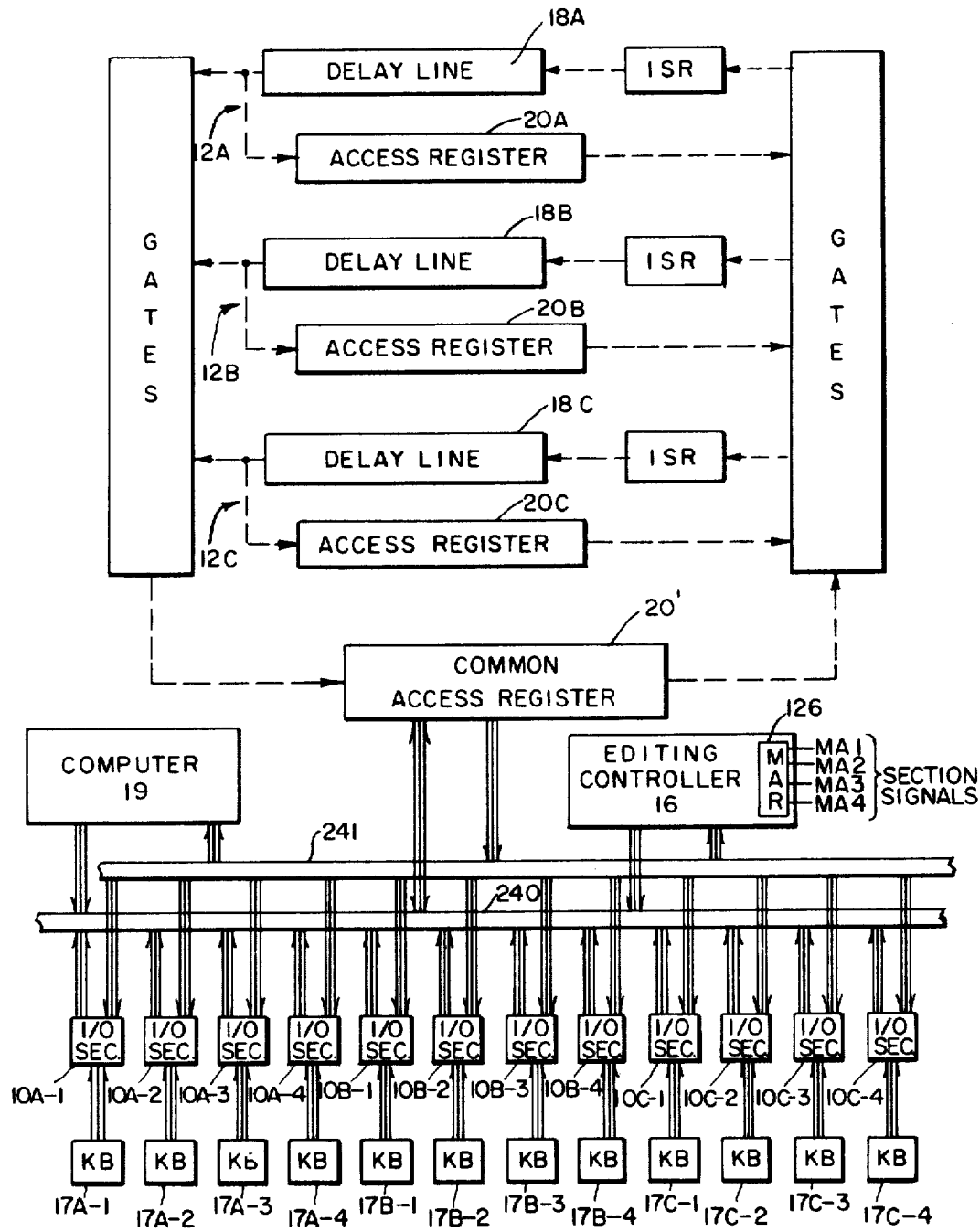
FIGS. 14–18 illustrate schematically another time sharing system involving the use of a plurality of internal memories and arranged to derive inputs from a large number of sources.
Figure 15:
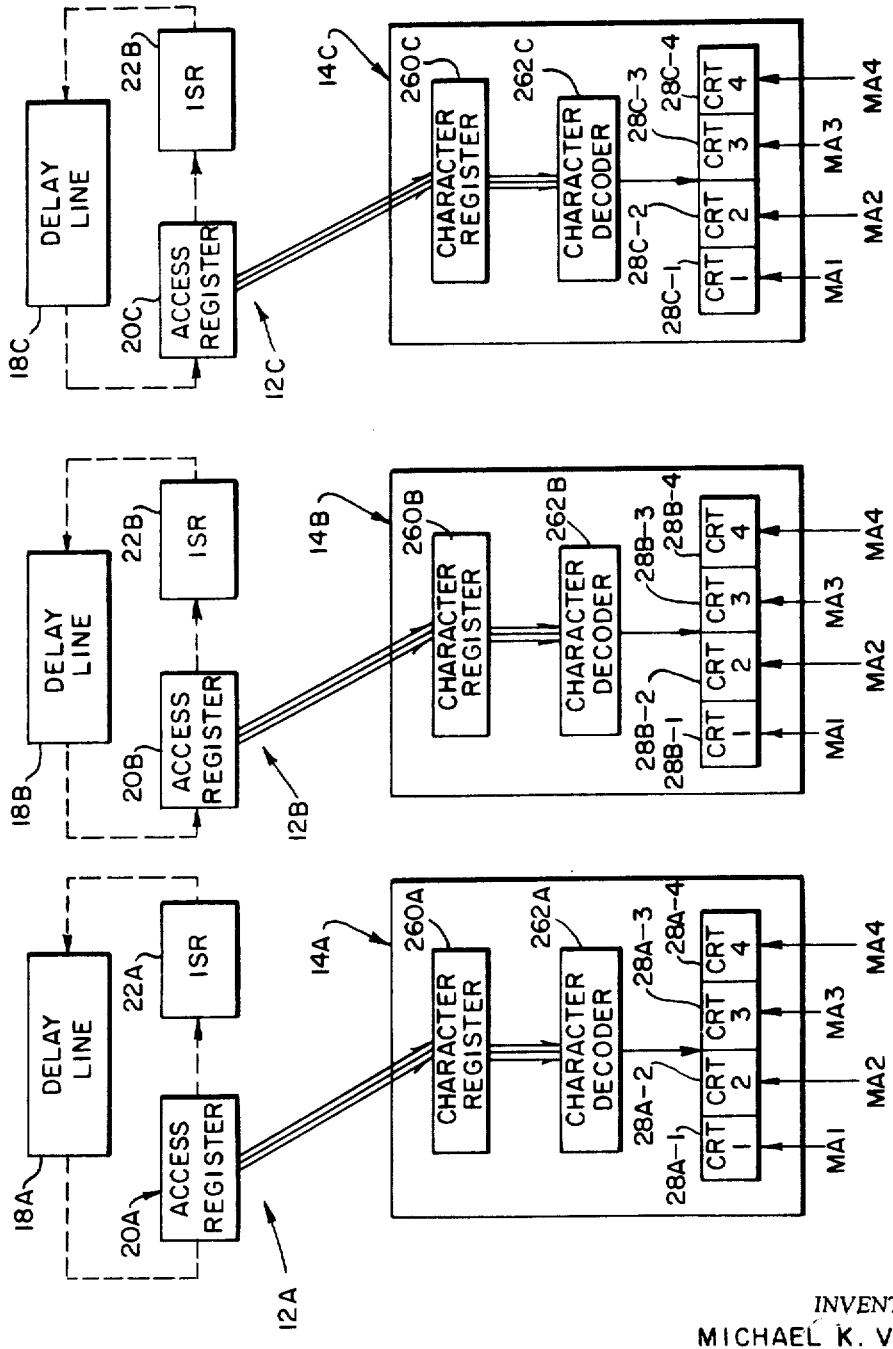

Another time sharing arrangement is illustrated in FIGS. 14 and 15. Referring first to FIG. 14, keyboards 17A–1—17A–4, 17B–1—17B–4 and 17C–1—17C–4 transmit characters to the editing controller 16 by way of input-output sections 10A–1—10A–4, 10B–1—10B–4 and 10C–1—10C–4, to perform editing operations in memories 12A, 12B and 12C. The letter suffixes denote the various units associated with the respective memories. Thus, the keyboards 17A all operate in conjunction with the memory 12A while the keyboards 17B and 17C operate with the memories 12B and 12C, respectively. In the illustrated system each of the memories is divided into four sections, with one of the keyboards assigned to each section in an arrangement similar to that of the two-section system of FIG. 13. Additionally, the editing controller 16 cycles among the three memories 12 and in this manner the system permits simultaneous use of twelve keyboards plus a separately connected computer 19.

More specifically, a common access register 20' provides access to all three memories by operating essentially in parallel with the individual access registers 20A, 20B and 20C of the memories 12. In the operation of the system of FIG. 1, each memory address is shifted into the access register 20 over an interval of nine timing pulses. Before the next memory address beings to enter the access register, there is an interval of eighteen timing pulses during which two intermediate characters enter the register 20. The common access register 20' of FIG. 14 is connected in tandem so that in the eighteen-timing pulse interval between the addresses of the memory 12A, it makes addresses in the memories 12B and 12C accessible.

Figure 17:
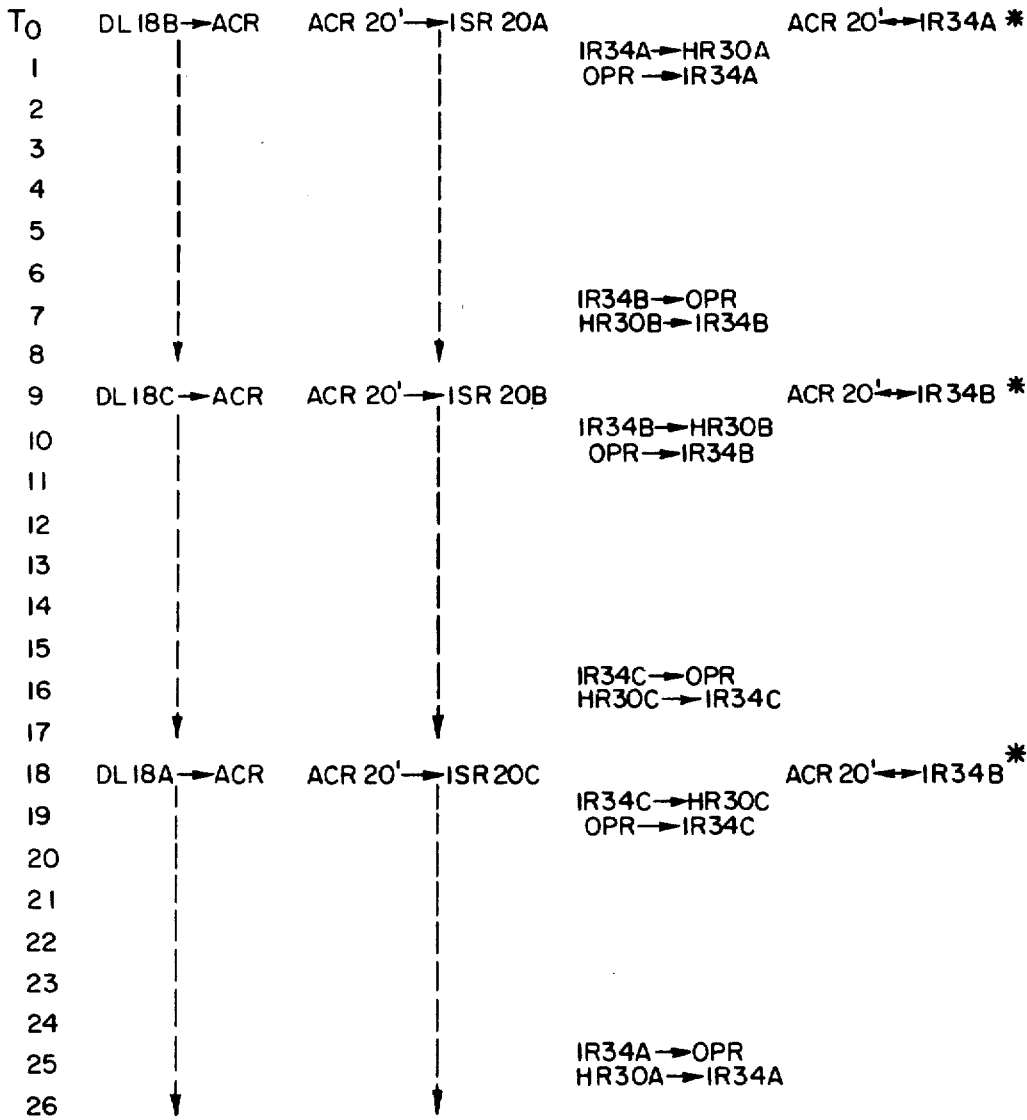

Thus, assuming that the consecutive addresses in the memory 12A are to be accessible during the interval $T_0$, the register 20' is connected to receive consecutive bits from the delay line 18A during the preceding interval $T_{18}$–$T_{26}$, as indicated in FIG. 17. During the interval $T_0$, when and entire character from the memory 12A is contained in the register 20', the editing controller 16 initiates an editing function for that character, if required. Then, at the end of the interval $T_0$, the character in the register 20' begins to shift out into the intermediate shift register 22A of the memory 12A. Accordingly, for each consecutive address in the memory 12A the access register 20' is substituted for the register 20A.

Similarly, as the character in the register 20' begins to shift out at the end of the interval $T_0$, a character from the delay line 18B shifts into the other end of this register. This simultaneous shifting out and shifting in continues until, at the end of the interval $T_8$, an entire character from the memory 12B has replaced the character from the memory 12A previously in the register 20'. The editing controller 16 then operates in conjunction with the memory 12B during the interval $T_9$, at the end of which the character at that time in the register 20' begins to shift into the intermediate shift register 22B. Thus, the sysem substitutes the register 20' for the register 20B during the period of access to the memory 12B.

Finally, during the interval $T_9$–$T_{17}$, as the contents of the access register 20' are being shifted into the memory 12B, a character from the delay line 18C simultaneously shifts into this register. During the period $T_{18}$ the editing controller 16 initiates an editing function in connection with the memory 12C and at the end of $T_{18}$ the register 20' begins to shift its contents into the intermediate shift register 22C. At the same time, the character in the next accessible address in the memory 12A begins to shift into the register 20'.

Figure 16:
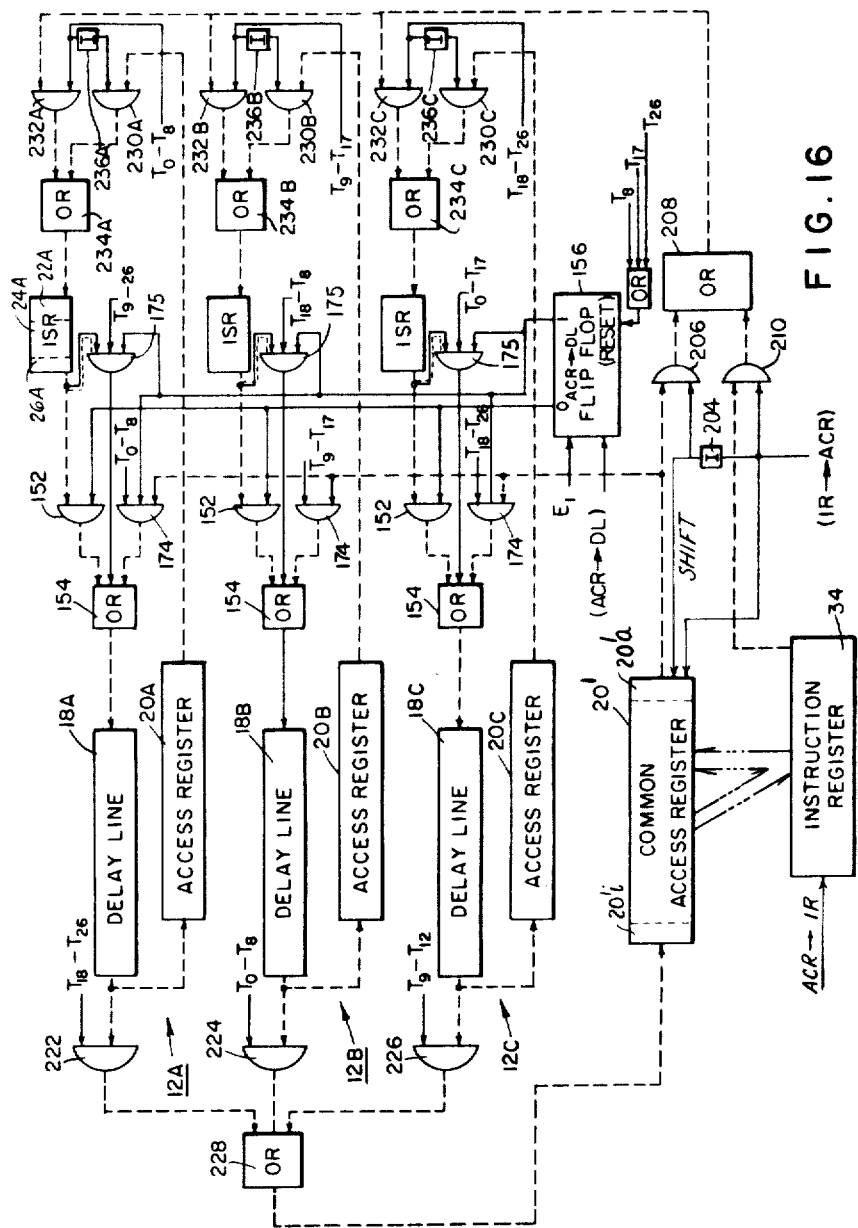

The serial gating for the access register 20' is shown in FIG. 16. The inputs from the delay lines 18A, 18B and 18C are applied to AND circuits 222, 224 and 226 and the outputs of the AND circuits are applied to the input end stage 20'i of the access register 20' by an OR circuit 228. The AND circuit 222 is enabled by the timing pulses $T_{18}$–$T_{26}$; the AND circuit 224 is enabled by the pulses $T_0$–$T_8$; and the AND circuit 226 is enabled by the pulses $T_9$–$T_{17}$. Thus, the AND circuits 222, 224 and 226 pass characters from the respective delay lines 18 of FIG. 14 to the register 20' during these intervals.

The output of the stage 20'a at the output end of the register 20' is pased through an AND circuit 206 to an OR circuit 208 and on to one of the shift registers 22 through a timing arrangement comprising AND circuits 230 and 232 and OR circuits 234. Specifically, the output of the OR circuit 208 is applied to the AND circuits 232A, 232B and 232C. The AND circuit 232A is enabled during the interval $T_0$–$T_8$; the AND circuit 232B during the interval $T_9$–$T_{17}$; and the AND circuit 232C during the interval $T_{18}$–$T_{26}$. During the interval when the AND circuit 232A is disabled, the AND circuit 230A is enabled by means of an inverter 236A to pass successive bits from the access register 20A (FIG. 16) to the shift register 22A by way of an OR circuit 234A. Similarly, when the AND circuit 232B is disabled, an inverter 236B enables the AND circuit 230B to connect the access register 20B to the shift register 22B; and when the AND circuit 232C is disabled, an inverter 236C enables the AND circuit 230C to connect the access register 20C to the shift register 22C. Accordingly, each of the access registers 20A, 20B and 20C is bypassed by the register 20' only when it contains an address to be made accessible thereby.

Accordingly, during the interval $T_0$–$T_8$, for example, and specifically at the end of each of the timing pulses $T_0$–$T_8$, a character in the access register 20', previously obtained from the delay line 18A during the interval $T_{18}$–$T_{26}$, shifts, bit-by-bit, into the register 22A. At the same time a character from the delay line 18B is shifted, bit-by-bit, into the input stage 20'i of the access register for operation in the manner described above.

The system performs editing operations with the circuit of FIG. 16 in the same manner as it operates with the circuit of FIG. 12 described above. Thus, when a character in an instruction register 34 is to be entered into a memory, the character is transferred in parallel from the register 34 to the access register 20' by an IR→ACR signal at the end of the timing pulse during which the apropriate memory address is contained in the register 20'. When a character from the memory 12A is in the ergister 20', the operation is performed at the end of the interval $T_0$, and when a character from the memory 12B or 12C is contained in this register, the operation is performed at the end of the interval $T_8$ or $T_{18}$, as the case may be.

For the IR→ACR transfer the register 34 is offset from the register 20' for the reason set forth above and therefore the output of the end stage 34a of the register 34 is passed to the OR circuit by way of an AND circuit 210. The AND circuit 210 is enabled by the IR→ACR signal and the AND circuit 206, which is ordinarily enabled by the output of an inverter 204 in the absence of this signal, is disabled at this time. At the end of the one-pulse interval of the IR→ACR signal, the AND circuit 206 is again enabled and the rest of the character, which has been loaded into the access register 20' begins to shift out into one of the intermediate shift registers 22 in the manner described above.

To perform an insertion, the editing controller emits both an IR→ACR signal to transfer a character from a register 34 to the register 20', and an ACR→IR signal to transfer to the register 34 the character in the register 20'. This swapping operation continues, as successive addresses from the same memory pass through the register 20', in exactly the same manner as swapping is accomplished by the circuit of FIG. 12.

The arrangement for deletion of a character, with a subsequent internal memory shift to fill the space left thereby, is accomplished by means of a flip-flop 156, AND circuits 152 and 174, and OR circuits 154, operating in the same manner as their counterparts of FIG. 12. Thus, when the flip-flop 156 is set by an ACR→DL signal, it enables the AND circuits 174 so that the output of the access register 20' is fed directly to the appropriate delay line 18A, 18B or 18C, as determined by the timing signals applied to these AND circuits. The flip-flop 156 is reset by means of a timing pulse $T_8$, $T_{17}$ or $T_{26}$, depending on whether the ACR→DL signal was emitted during $T_0$, $T_9$ or $T_{18}$.

Whenever the flip-flop 156 is set, all the AND circuits 152 are disabled thereby. However, the shift register 26 in only one of the memories 12, i.e. the memory in which the deletion is taking place, should be disconnected from its associated delay line. Therefore, the system includes AND circuits 175, enabled by the flip-flop 156 and appropriate timing signals to bypass the two disabled AND circuits 152 in the memories in which the deletion is not under way.

With further reference to FIG. 16, the output operation is performed, as in FIG. 12, by means of the ACR→IR signal which transfers a character in the access register 20' to the instruction register 34 connected thereto.

With further reference to FIG. 14, the successive switching of the input-output sections 10 into operation with the editing controller 16 is accomplished by means of an input buss 240 and an output buss 241 to which all of the instruction registers 34 are connected in turn. During the period in which the first of the four sections of each of the memories is passing through the access register 20′, the system cycles among the input-output sections 10A–1, 10B–1 and 10C–1, alternately connecting the instruction registers 34A–1, 34B–1 and 34C–1 to the busses 240 and 241. When the second sections of the memories pass through the access register, the system cycles among the input-output sections 10A–2, 10B–2 and 10C–2 and alternately connects the instruction registers 34A–2, 34B–2 and 34C–2 to the busses. The registers 34 associated with the third and fourth sections of the memories 12 are similarly connected to the busses 240 and 241 at the appropriate times.

Figure 18:
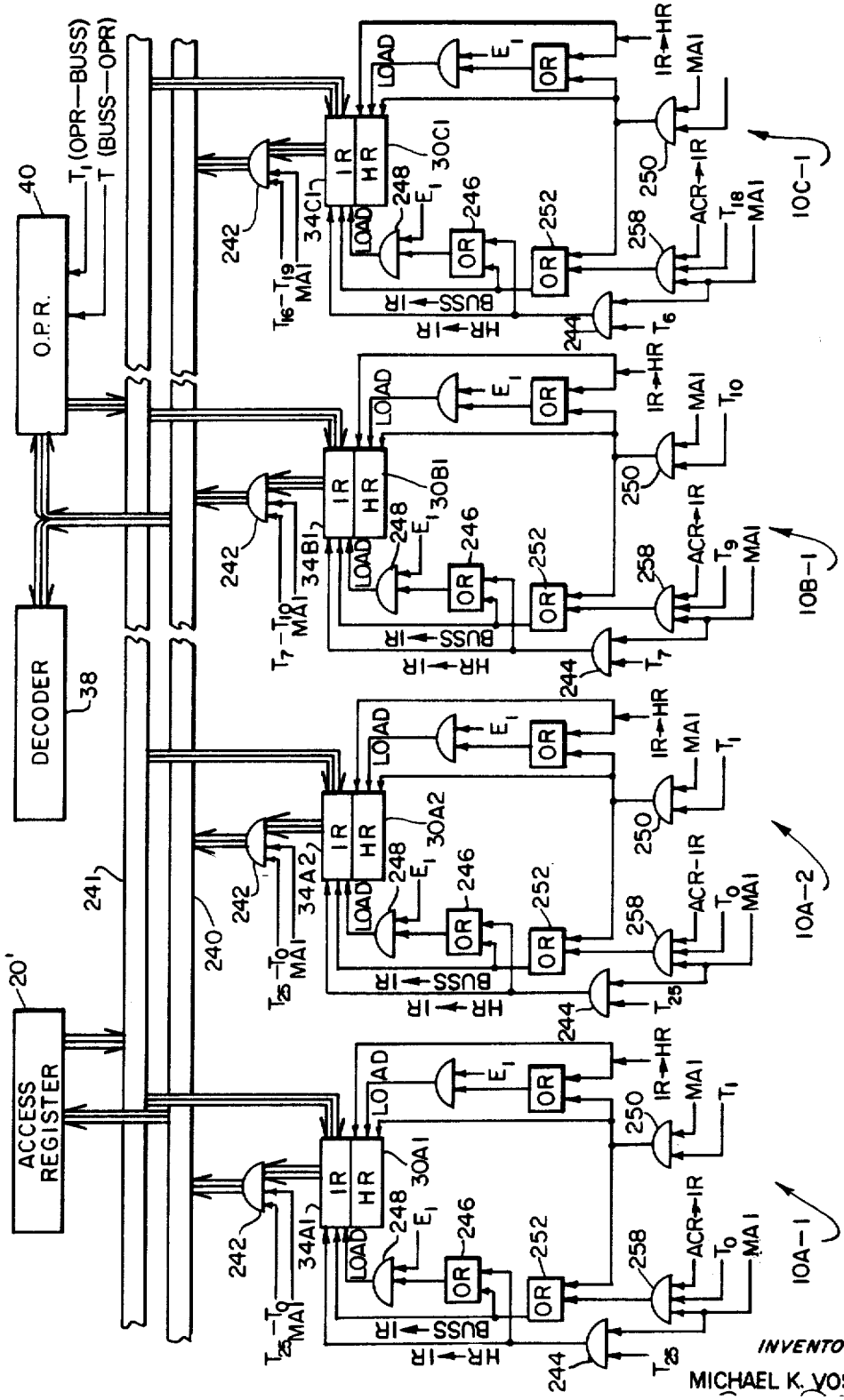

The gating arrangement associated with operation of the busses 240 and 241 is illustrated in FIG. 18. For convenience, the gating for only the input-output sections 10A–1, 10A–2, 10B–1 and 10C–2 is shown, the other input-output sections being identically arranged. In the section 10A–1 the output terminals of the instruction register 34A–1 are connected to the buss 240 by a corresponding number of AND circuits 242. The AND circuits 242 are enabled during the interval $T_{25}$–$T_0$ by an "MA—1" signal from the memory address register 126 (FIG. 14) indicating that the first sections of the respective memories 12 are being passed through the access register 20′. Additionally, the presence of the MA—1 signal during the interval $T_{25}$ causes an AND circuit 244 to emit an HR→IR signal opening the gates leading from the holding register 30A–1 to the instruction register 34A–1. The HR→IR signal is also passed by an OR circuit 246 to enable an AND circuit 248 to pass an $E_1$ pulse as a LOAD IR pulse.

Similarly, the presence of the MA—1 signal during the interval $T_1$ causes an AND circuit 250 to emit a signal passed by an OR circuit 252 as a BUSS→IR signal enabling gates leading from the buss 241 to the register 34A–1. This signal is also passed through the OR circuit 246 to enable the AND circuit 248 to apply a LOAD IR pulse to the register 34A–1. At the same time the output of the AND circuit 250 is used as an IR→HR signal enabling the gates leading from the register 34A–1 to the holding register 30A–1. This signal further enables an AND circuit 254 to pass a LOAD HR pulse to an OR circuit 256 and on to the register 30A–1.

Thus, during the duration of the MA—1 signal, i.e. when the first section of each of the memories 12 is accessible, the contents of the register 30A–1 are shifted up to the instruction register 34A–1 and the contents of the instruction register are made available on the buss 240 at the end of each interval $T_{25}$ in the same manner as described above in connection with FIGS. 1 and 4. At the same time, the character placed on the buss 240 from the register 34A–1 is loaded into the operation register 40. In accordance with the above-described operation, this character comprises an operation character and a routine character. The character shifted from the holding register to the instruction register 34A–1 is generally either an instruction character or an alphanumeric character.

Referring to FIG. 14, with a character from the first section of the memory 12A accessible in the register 20′ during the interval $T_0$, the editing controller 16 is in condition to perform an editing operation if required.

If, for example, the marker signal is required for the particular routine to be performed and it does not coincide with the character in the register 20′, the editing controller 16 will stand by and at the end of the interval $T_1$, appropriate gates associated within the operation register 40 (FIG. 18) will be enabled in order to place the contents of the register 40 on the return buss 241. At the same time, the gates associated with the instruction register 34A–1 and holding register 30A–1 will be enabled so that the next $E_1$ pulse will transfer the contents of the instruction register to the holding register and the character on the buss 241 to the instruction register 34A–1. This up-down cycling will continue through successive $T_{25}$–$T_1$ intervals until the marker signal is present during the interval $T_0$ and at that time the required editing operation will be performed.

If the editing operation calls for a transfer of the character in the instruction register 34A–1 to the memory 12A, the appropriate gates in the access register 20′ are enabled as illustrated in FIG. 16, the IR→ACR transfer taking place by way of the interconnecting buss 240 (not shown in FIG. 16). If a transfer in the other direction is required, an ACR→IR signal is applied to an AND circuit 258 (FIG. 18) and the coincidence of this signal with the $T_0$ pulse and the MA—1 signal develops a BUSS→IR signal which loads the register 34A–1 from the buss 241. At the same time, suitable gates (not shown) connect the output terminals of the individual stages of the access register 20′ to the buss 240 for a transfer of the character in the access register directly to the instruction register. During an INSERT operation, the contents of the registers 24A–1 and 20′ are swapped as described above.

Since the instruction register 34A–1 is connected to the buss 240 only during the interval $T_{25}$–$T_1$, any of the instruction registers 34B can be coupled to the buss during the interval $T_2$–$T_{10}$ without interfering with operation of any of the sections 10A. This permits an upward shift in the registers 30B and 34B to set the editing controller for operation during the interval $T_9$, when an address in the memory 12B is accessible in the register 20′.

This arrangement is shown for the input-output section 10B–1 in FIG. 18. With gating similar to that used with the section 10A–1, except for the substitution of the appropriate timing signals, the transfers to and from the operation register 40 and the access register 20′ take place in exactly the manner described above, with the "push down" operation returning the operation character to the instruction register 34B–1 taking place at the end of the interval $T_{10}$.

Next, during the interval $T_{16}$, an input-output section 10C, e.g. the section 10C–1 of FIG. 18, is connected to the buss 240 and an upward shift in the holding and instruction registers therein sets the editing controller for operation during the interval $T_{18}$. As indicated in FIG. 17, this is the interval during which an address in the memory 12C (FIG. 14) is accessible in the register 20′ for modification of its contents by the editing controller if required at that time. The "push down" of characters into the instruction register 34C–1 and the holding register 30C–1 takes place at the end of the interval $T_{19}$.

In connection with the input-output sections 10B and 10C, it should be noted that the period during which characters can be loaded into the holding registers therein, or extracted from the holding registers during output operations, differ by nine and eighteen timing pulse intervals, respectively, from the corresponding periods associated with the sections 10A. The checking of the holding registers to determine whether or not they are empty and the checking of the instruction registers to determine whether input or output operations are involved, described above in connection with the input-output section 10 of FIGS. 4 and 5, is therefore modified accordingly, insofar as the timing is concerned.

Thus, as addresses from the memories 12A, 12B and 12C become successively accessible in the register 20′, the input-output sections 10A–1, 10B–1 and 10C–1 are successively connected to the editing controller 16 for editing operations. This sequence continues as long as addresses in the first sections of each of the memories pass through the access register 20′. At the end of this period, when the second sections of the respective memories begin passing through the common access register, the memory address register 126 (FIG. 14) drops its MA—1 signal and emits an MA—2 signal.

As shown in FIG. 18, this disables the gating connecting the input-output sections 10A-1, 10B-1 and 10C-1 to the buss 240 and substitutes the input-output sections 10A-2, 10B-2 and 10C-2. Operation then continues as before, with the system cycling among the latter three input-output sections as the addresses from the corresponding memories 12A, 12B and 12C pass through the access register 20'. Similarly, during the passages of the third and fourth memory sections through the access register 20', the memory address register 126 (FIG. 14) emits MA—3 and MA—4 signals, respectively, thereby enabling connection of the input-output sections 10A-3, 10B-3 and 10C-3 and finally the input-output sections 10A-4, 10B-4 and 10C-4 to the buss 240 during the appropriate intervals. From the fourth memory sections the recirculating memories progress to the first memory sections and the address register 126 emits an MA—1 signal to begin the cycle once again.

The memory address register 126 also emits "first" and "last" signals corresponding to the beginnings and ends of the individual memory sections for use in accordance with the decision table.

The time sharing system of FIG. 14 is designed to provide a separate display for each of the keyboards. As shown in FIG. 15, there is a display section 14A connected to the memory 12A, a section 14B connected to the memory 12B, and a section 14C connected to the memory 12C. The display section 14A, which is identical to the sections 14B and 14C, includes a character register 260A connected to receive the characters in the successive memory addresses contained in the register 20A in the memory 12A. Thus, a parallel transfer from the register 20A to the register 260A is made at the end of each interval $T_0$. In like manner, the character registers 260B and 260C receive the characters from the memories associated with them at the ends of the respective intervals $T_9$ and $T_{18}$.

The contents of the register 260A are decoded by a character decoder 262A, which determines the presence of various display instruction characters and alphanumeric characters to index the beam in the particular cathode ray tube 28A generating characters at that time. The decoder 262A also provides character signals corresponding to characters to be displayed. At the same time, the memory section signals (e.g. MA—1) from the memory address register 126 are applied to the unblanking circuits of the cathode ray tubes 28A, so that the tube 28A—1 is unblanked by the signal MA—1, the tube 28A-2 by the signal MA—2 and so on. Thus, the cathode ray tube associated with each keyboard is unblanked during the display of the section of the memory to which that keyboard has access.

This arrangement demonstrates the further utility of the "home" display instruction character. This character is entered into the first address in each of the four sections of each of the memories 12. Thus, when the first memory address in a section becomes accessible to a display section 14, the beam in the particular cathode ray tube 28 which is to display the display characters in that section is automatically indexed to the upper left-hand corner, i.e. the beginning point for each display.

The time sharing system of FIGS. 13–18 provides a particularly efficient utilization of the editing controller 16, which is the costliest single unit in the system, by having the controller operate in tandem with three separate memories, thereby filling in the "time gaps" between the consecutive addresses in each of the memories. Furthermore, by subdividing each of the memories into a plurality of sections, the system permits operation with a plurality of keyboards associated with each memory just as the system of FIG. 1 operates with a single keyboard.

In the system of FIG. 14 the computer 19 is shown separately connected to the busses 240 and 241 for operation in conjunction with all the keyboards. One manner in which this may be accomplished is to have each keyboard signal the computer when information is to be transmitted to or from the computer. The computer then takes the place of the signalling keyboard during the interval that the input-output section 10 associated with the keyboard would otherwise be connected to the buss 240. There are, of course, other ways in which the operation of the computer 19 can be arranged with the time sharing system. Alternatively, each of the keyboards may operate with its own external data processing system as in the arrangement illustrated in FIG. 13.

Thus, I have described an improved editing system for use with electronically stored characters. The system provides a visual display of the information to be edited, with the editing operations taking place simultaneously with the display. The operator can thus immediately verify the results of the editing operations and, equally important, use the display in determining which editing operations to use and where to perform them. To this end the system includes a marker signal (a) indicating on the display the location where the editing operation will take place and (b) synchronizing the editing operation with access to an internal memory, so that the operator need not have any knowledge of the memory address corresponding to the location in the display where the editing operation is to be performed.

The editing system permits the operator to perform all of the desired editing functions efficiently, including insertion and deletion operations in which succeeding characters in the display are shifted to make room for a new character or to fill up the space left by the deletion of a previously displayed character. A corresponding adjustment is made in the memory addresses of the various characters. In general these operations are performed faster than a keyboard operator can function and therefore they are performed essentially instantaneously. Furthermore, the data stored in a computer may be quickly transferred into the editing system for various editing operations and then returned to the computer. The system accomplishes all these functions with a relatively simple logical arrangement and therefore can be constructed at a relatively low cost.

The system is also well adapted to a time sharing arrangement in which the editing functions are performed for a number of keyboards by a single editing unit without any sacrifice in speed of operation. Two such time sharing systems, one of which involves the use of a plurality of internal memories, have been described above.

It will be appreciated that in addition to the various modifications described above, other variations of the specific constructions described herein may be used without departing from the scope of the invetnion. For example, the functions of a recirculating type memory may be duplicated in a static memory of the core type, for example, with the recirculation function being obtained by simply cycling through successive addresses in the core memory.

As another example, various sequencing functions, such as those performed by the sequence unit 98 of FIG. 5, can be accomplished in part by use of a multi-stable circuit in place of the combination of a register plus a decoder.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In an editing and display system of the type including
   (i) a memory for storing display characters and display location characters in respective addresses therein,
   (ii) means cyclically providing access to said memory addresses,
   (iii) a display unit connected to provide a display of the accessible display characters in display locations determined by said display location characters,
   (iv) means providing a visible marker in a selectable location on the display, and
   (v) editing means for modifying the contents of said memory addresses, said editing means performing editing operations in memory addresses designated by the marker, the improvement
      (A) including means for entering a delimiting character into a selectable memory address,
      (B) in which said editing means includes means responding to accessible delimiting characters in said memory by preventing editing operations from proceeding beyond the delimiting characters.

2. The system defined in claim 1 in which said display unit responds to delimiting characters in said memory by shifting to a predetermined point in said display, whereby the display characters in said memory following each delimiting character are displayed in locations referenced to said predetermined position.

3. In an editing and display system of the type including
   (i) a memory for soring display characters and display location characters in respective addresses therein,
   (ii) means cyclically providing access to said memory addresses,
   (iii) a display unit connected to provide a display of the accessible display characters in display locations determined by said display location characters,
   (iv) means providing a visible marker in a selectable location on the display, and
   (v) editing means for modifying the contents of said memory addresses, said editing means performing editing operations in memory addresses designated by the marker,
the improvement including means for shifting the editing means between first and second modes of operation,
   (A) in said first mode, said editing means including means for performing editing operations involving display location characters in any selected memory addresses, and
   (B) in said second mode, said editing means including means limiting editing operations to display characters in memory addresses that do not contain display location characters.

4. The system defined in claim 3 including
(A) means for entering delimiting characters into said memory when said editing means is in said first mode of operation, and
(B) means for responding to delimiting characters in said memory by preventing editing operations from proceeding beyond the delimiting characters when said editing means is in said second mode of operation.

5. The system defined in claim 3
(A) in which said editing means performs its editing operations in response to editing commands in the form of input characters,
(B) including input means for supplying input characters including display characters, display location characters and editing commands to said editing means and said memory,
(C) in which said editing means when in said first mode responds to certain input command characters by entering, removing and shifting display location characters in said memory, and
(D) in which said editing means when in said second mode responds to said certain commands only by shifting said marker.

6. In an editing and display system of the type including
   (i) a memory for storing display characters and display location characters in respective addresses therein,
   (ii) means cyclically providing access to said memory addresses,
   (iii) a display unit connected to provide a display of the accessible display characters in display locations determined by said display location characters,
   (iv) means providing a visible marker in a selectable location on the display, and
   (v) editing means for modifying the contents of said memory addresses, said editing means performing editing operations in memory addresses designated by the marker,
the improvement
   (A) including an instruction register,
   (B) including input means for transferring successive input characters into said instruction register, said input characters including display characters, display location characters, operation characters and editing instruction characters,
   (C) including loading means for transferring characters from said instruction register to said memory,
   (D) including an operation register for holding operation characters,
   (E) including means for transferring operation characters from said instruction register to said operation register,
   (F) in which said editing means includes
      (1) means for decoding accessible characters in said memory,
      (2) means for decoding the characters in said instruction register and said operation register,
      (3) a logic uunit responsive to the outputs of said decoding means for controlling various editing functions on the contents of said memory,
   (G) including means for supplying a delimiting character to said input means for entry into a selectable memory address, and
   (H) in which said editing means includes means responding to the output of said accessible character decoding means, when a delimiting character in said memory is accessible, by preventing editing operations from proceeding beyond the delimiting character in said memory.

7. The system defined in claim 6, in which said display unit responds to delimiting characters in said memory by shifting to a predetermined point in said display, whereby the display characters in said memory following each delimiting character are displayed in locations referenced to said predetermined position.

8. The system defined in claim 6
(A) including means for shifting said editing means between first and second modes of operation,
(B) in said first mode said editing means including means responding to said instruction register decoding means by performing editing operations on display location characters in any selected memory addresses, and
(C) said editing means further including means for limiting editing operation in said second mode to display characters in memory addresses that do not contain display location characters.

9. The system defined in claim 8 in which
(A) in said first mode said editing means responds to certain characters in said operation regitser by entering into said memory a display location character contained in said instruction register, and (B) in said second mode said editing means responds to display location characters in said instruction register by shifting said marker, thereby to prevent alteration of the format of said display when said editing means is in said second mode.

10. In a multiple user editing and display system including
   (i) a digital memory for storing characters in various addresses therein,
   (ii) memory access means making successive addresses in said memory periodically accessible,
   (iii) editing means connected to said access means for performing editing functions, including modifying the contents of said memory addresses, in response to externally supplied commands,
   (iv) a plurality of character sources for said memory, and
   (v) a plurality of display units for displaying display characters contained in memory addresses, the improvement including
   (A) a plurality of input sections, each input section being connected to transmit characters from said source to said editing means,
   (B) a memory address register for providing signals indicating the periods during which respective sections of said memory are accessible in said access means,
   (C) means assigning at least one of said memory sections exclusively to each of said character sources by connecting only the input section connected with the source to said editing means in response to the memory address signal indicating that section is accessible in said access means, and
   (D) means responsive to said memory address signals for
      (1) causing each of said display units to display characters that are accessible when a given input section is connected to said editing means, and
      (2) preventing display by the display means when other input sections are connected to said editing means, whereby the operator of each of the said character sources may perform editing operations on characters displayed by one of said display units without affecting the displays of other display units.

11. The combination defined in claim 10
   (A) in which each of said character sources provides
      (1) alphanumeric characters to be stored in said memory and displayed by said display means,
      (2) instruction characters including display instruction characters for storage in said memory and used by said display control means to develop said location signals, and
      (3) operation characters,
   (B) in which each of said input-output sections includes
      (1) a holding register, and
      (2) an instruction register,
   (C) in which said editing means includes an operation register,
   (D) including
      (1) first transfer means for transferring characters from said character sources into said holding registers,
      (2) second transfer means for transferring to said instruction registers the characters in said holding registers,
      (3) third transfer means for transferring to said holding registers the characters in said instruction registers,
      (4) fourth transfer means for transferring the contents of said instruction registers to said operation register, and
      (5) fifth transfer means for transferring the contents of said operation register to said instruction registers,
   (E) means for timing the operation of said second, third, fourth and fifth transfer means so that during the period each input-output section is connected to said editing means
      (1) the contents of the instruction register in that input-output section are transferred to said operation register and the contents of the holding register in that input-output section are transferred to the instruction register therein, and then after an interval in which said editing means performs an editing function,
      (2) the contents of said instruction register in said input-output section are transferred to said holding register and the contents of said operation register are transferred to said instruction register,
   (F) in which said editing means includes
      (1) means for decoding the characters in said operation and instruction registers,
      (2) means for decoding the characters in said accessible memory address during said interval, and
      (3) a logic unit controlling the functions of said editing means in response to the outputs of said decoding means.

12. The combination defined in claim 11 in which one of said editing functions is a loading function, and including means for accomplishing said loading function by transferring the contents of said instruction register to an accessible memory address during said interval.

13. The combination defined in claim 12 including
   (A) means providing a visible marker signal in a location on each of said displays and an electrical marker signal at the time each of the memory addresses corresponding to the location is accessible, and
   (B) means synchronizing functions of said editing means to begin during the presence of said electrical marker signal whereby editing operations are performed in the location of said visible marker signal.

14. An editing and display system of the type including
   (i) storage means for storing characters in various addresses therein,
   (ii) editing means for performing editing functions that include modification of the contents of said addresses,
   (iii) a plurality of character sources for providing characters to be entered into said storage means, and
   (iv) a plurality of display units for displaying characters stored in said storage means, the improvement
   (A) in which said storage means comprises a plurality of recirculating digital memories each of which
      (1) includes a plurality of memory addresses, and
      (2) includes a memory access register through which memory characters are shifted bit-by-bit, each access register deriving its input from an access source and delivering its output to an access output point in the same memory,
   (B) a plurality of display control means, each of which
      (1) is connected to one of said memories, and
      (2) includes means for decoding characters in the addresses therein to develop
         (a) character signals corresponding to display characters to be displayed, and
         (b) location signals correspondingly to locations of the displayed characters,
   (C) a plurality of input sections, each input section
      (1) being connected with one of said character sources, and
      (2) including means for transmitting characters from said source to said editing means,
   (D) switching means for cycling among said input sections to connect them in turn to said editing means,

41

(E) a memory address register providing signals indicating the periods during which respective sections of each of said memories are passing through said access sources therein,
(F) means assigning each of said character sources to at least one of said memory sections by connecting only the input sections connected with the sources assigned to corresponding sections in the respective memories to said editing means in response to the memory address signals indicating that such sections are passing through said access sources,
(G) each of said display units providing a display of display characters in response to the signals developed by the display control means connected to the memory to which one of said sources is assigned,
(H) means responsive to said memory address register signals for preventing each of said display means from displaying the characters in memory sections assigned exclusivley to the character sources associated with other display means deriving signals from the same memory, whereby the operator of each of said character sources can edit material displayed by one of said display means without affecting the material displayed by other display means.

15. The system defined in claim 10
(A) including a common shift register,
(B) including means cycling the output of said common register among said access sources and cycling the output of said common register among said output points, whereby said common register periodically, in cyclic fashion, contains a character from each of said memories, and
(C) in which said editing means includes means for modifying the contents of said memory addresses by modifying the contents of said common register.

16. The combination defined in claim 15
(A) in which each of said character sources is arranged to provide
  (1) alphanumeric characters to be stored in said memory and displayed by said display units,
  (2) instruction characters including display instruction characters for storage in said memory and used by said display control means to develop said location signals, and
  (3) operation characters,
(B) in which each of said input sections includes
  (1) a holding register, and
  (2) an instruction register,
(C) in which said editing means includes an operation register,
(D) including
  (1) first transfer means for transferring characters from said character sources into said holding registers,
  (2) second transfer means for transferring characters from said holding registers to said instruction registers,
  (3) third transfer means for transferring to said holding registers the characters in said instruction registers,
  (4) fourth transfer means for transferring the contents of said instruction registers to said operation register, and
  (5) fifth transfer means for transferring the contents of said operation register to said instruction registers,
(E) means for timing the operation of said second, third, fourth and fifth transfer means so that durduring the period each input section is connected to said editing means
  (1) the contents of the instruction register in that input section are transferred to said operation register and the contents of the holding register in that input section are transferred to the instruction register therein, and then after an interval in which said editing means performs an editing function,
  (2) the contents of said instruction register in said input section are transferred to said holding register and the contents of said operation register are transferred to said instruction register,
(F) in which said editing means functions in response to characters simultaneously in said
  (1) operation register,
  (2) instruction register of the input section connected to said editing means, and
  (3) common register.

17. The combination defined in claim 16 in which one of said editing functions is a loading function, means for accomplishing said loading function by transferring to said common register the character contained in the instruction register of the input section connected to said editing means.

References Cited

UNITED STATES PATENTS

| | | | |
|---|---|---|---|
| 3,037,192 | 5/1962 | Everett | 340—172.5 |
| 3,241,120 | 3/1966 | Amdahl | 340—172.5 |
| 3,248,705 | 4/1966 | Dammann et al. | 340—172.5 |
| 3,299,408 | 1/1967 | Wang et al. | 340—172.5 |
| 3,307,156 | 2/1967 | Durr | 340—172.5 |
| 3,312,950 | 4/1967 | Hillman et al. | 340—172.5 |
| 3,317,783 | 5/1967 | Neumeister | 235—198 X |
| 3,323,119 | 5/1967 | Barcomb et al. | 340—324 |
| 3,332,071 | 7/1967 | Goldman et al. | 340—172.5 |
| 3,337,855 | 8/1967 | Richard et al. | 340—172.5 |
| 3,346,853 | 10/1967 | Koster et al. | 340—172.5 |

PAUL J. HENON, Primary Examiner

RONALD F. CHAPURAN, Assistant Examiner